United States Patent
Chu et al.

(10) Patent No.: US 8,370,321 B2
(45) Date of Patent: Feb. 5, 2013

(54) AUTOMATED INFORMATION-PROVISION SYSTEM

(75) Inventors: John Chu, Bothell, WA (US); Jeff Bowden, Kirkland, WA (US); Christopher W. Jones, Seattle, WA (US); Stuart Graham, Kenmore, WA (US); Robert E. Arnold, Bellevue, WA (US); Paul G. Allen, Seattle, WA (US); Hubert E. Kolde, Mercer Island, WA (US)

(73) Assignee: Vulcan, Inc., Seattle, WA (US)

( * ) Notice: Subject to any disclaimer, the term of this patent is extended or adjusted under 35 U.S.C. 154(b) by 1104 days.

(21) Appl. No.: 12/231,678

(22) Filed: Sep. 4, 2008

(65) Prior Publication Data

US 2010/0057690 A1 Mar. 4, 2010

(51) Int. Cl.
*G06F 7/00* (2006.01)
(52) U.S. Cl. .................................................... 707/707
(58) Field of Classification Search .................. 707/760, 707/707
See application file for complete search history.

(56) References Cited

U.S. PATENT DOCUMENTS

| | | | |
|---|---|---|---|
| 6,266,667 B1 * | 7/2001 | Olsson | 1/1 |
| 7,013,308 B1 * | 3/2006 | Tunstall-Pedoe | 707/709 |
| 2002/0143737 A1 | 10/2002 | Seki | |
| 2004/0230666 A1 | 11/2004 | Taboada | |
| 2007/0143474 A1 | 6/2007 | Sheng | |
| 2007/0150442 A1 * | 6/2007 | Chin et al. | 707/3 |

* cited by examiner

*Primary Examiner* — Robert Beausoliel, Jr.
*Assistant Examiner* — Nirav K Khakhar
(74) *Attorney, Agent, or Firm* — Olympic Patent Works, PLLC

(57) ABSTRACT

Various system embodiments of the present invention are directed to an automated concierge system through which users of the automated concierge system can request and obtain many types of information and services. Unlike traditional search engines and electronic query-processing interfaces, the automated concierge systems provide much greater flexibility with respect to means of access, including types of electronic devices and communications media that can be used to access the concierge services, greater flexibility in the timing of responses to information and service requests, more efficient information and service provision, and access to a much broader range of information sources and service providers. The automated concierge systems that represent embodiments of the present invention provide state-associated searches, in contrast to the stateless searches generally provided by search engines and many electronic query-processing interfaces, and employ a generally asynchronous message-based interface, rather than the rigid request/response interfaces provided by traditional search engines and other electronic query-processing systems.

13 Claims, 27 Drawing Sheets

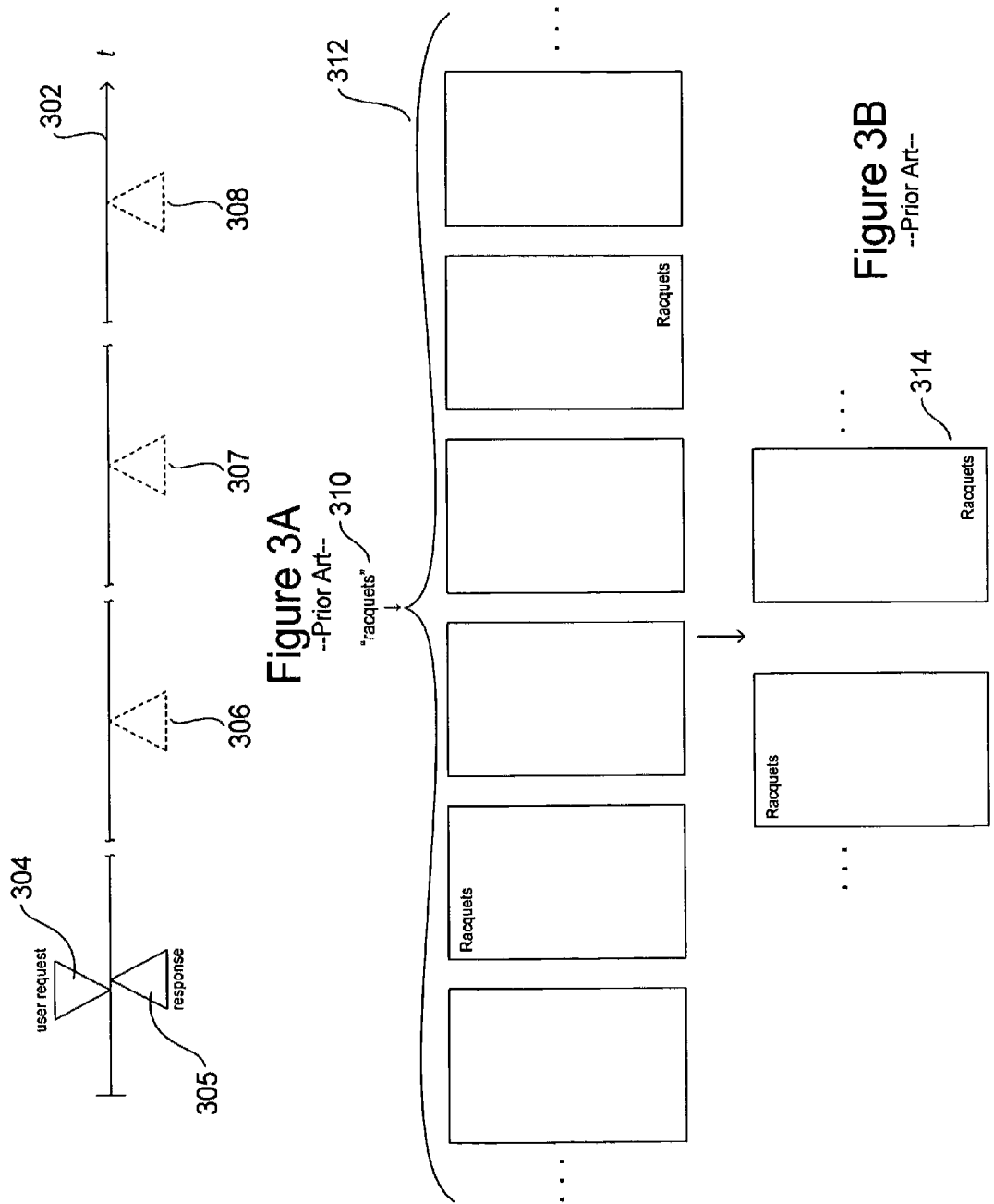

AUTOMATED INFORMATION-PROVISION SYSTEM

TECHNICAL FIELD

The present invention is related to automated information-provision systems and, in particular, to an automated information-provision system that provides a manageable quantity of information to a requesting user via an asynchronous request/response protocol, that relaxes time constraints and communications constraints associated with traditional search engines and query-processing systems, that provides interactive search-criteria focusing and transaction-execution-information acquisition, and that accesses a variety of different information-sources using a variety of types of search-criteria.

BACKGROUND OF THE INVENTION

With the advent of inexpensive and commonly available computer-networking technologies and inexpensive personal computers, those who own and/or use personal computers have grown accustomed to, and, in many cases, dependent on, electronic information searching and retrieval through various search-engine websites provided through the Internet. Consumers may currently carry out a large percentage of their retail transactions through the Internet, often facilitated by electronic Internet searches for retailers and products, and additionally employ the Internet for access to news, information about the weather, information about commercial, private, and governmental services, and for access to a host of additional services and information sources. Indeed, personal computers, electronic databases, and query-processing interfaces have replaced many older information retrieval systems, including card catalogs in public libraries, many of the traditional printed reference materials in public libraries, manual systems for access to public records and documents, and many other older information sources and searching systems.

Although search engines and the many query-processing interfaces used to access various electronic databases are increasingly successfully applied for providing information provision to consumers, personal-computer users, and the public at large, search engines and query-processing interfaces have certain drawbacks, constraints, and limitations. These drawbacks, constraints, and limitations may include a narrow range of devices from, and communications media through, which information can be accessed, a lack of effective targeting of searches in order to efficiently retrieve information, inflexibility with respect to timing of responses, and a narrow range of types of information sources that can be accessed. Thus, although search engines and various query-processing interfaces provide enormous benefit and useful access to information, those seeking information have recognized the need for more efficient, more flexible, and more powerful information-searching and information-retrieval systems.

SUMMARY OF THE INVENTION

Various system embodiments of the present invention are directed to an automated concierge system through which users of the automated concierge system can request and obtain many types of information and services. Unlike traditional search engines and electronic query-processing interfaces, the automated concierge systems provide much greater flexibility with respect to means of access, including types of electronic devices and communications media that can be used to access the concierge services, greater flexibility in the timing of responses to information and service requests, more efficient information and service provision, and access to a much broader range of information sources and service providers. The automated concierge systems that represent embodiments of the present invention provide state-associated searches, in contrast to the stateless searches generally provided by search engines and many electronic query-processing interfaces, and employ a generally asynchronous message-based interface, rather than the rigid request/response interfaces provided by traditional search engines and other electronic query-processing systems.

BRIEF DESCRIPTION OF THE DRAWINGS

FIGS. 1-3B illustrate characteristics and limitations of traditional search engines and other electronic query-processing systems.

DETAILED DESCRIPTION OF THE INVENTION

Embodiments of the present invention are directed to various types of automated concierge systems. These systems generally provide, upon request by users, information and services to users. However, unlike traditional search engines and other electronic query-processing interfaces, the automated concierge systems that represent embodiments of the present invention communicate with users in a generally asynchronous fashion, via message-based communications interfaces, associate state with each request, access a broad range of information sources and service providers, effectively tailor and process results to provide a manageable quantity of well-focused and appropriate information in response to user requests, and, over time, learn the types of information, information-presentation formats, and services desired by individual users in order to most effectively respond to subsequent user requests.

Figure 1:
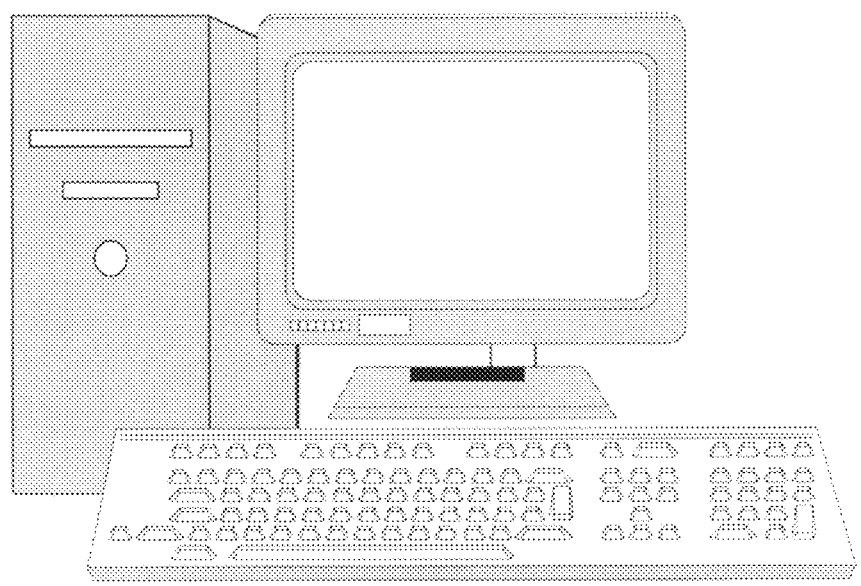

FIGS. 1-3B illustrate characteristics and limitations of traditional search engines and other electronic query-processing systems. First, as shown in FIG. 1, the personal computer is by far the most common platform for access to information through search engines and other electronic query-processing systems. Search engines are accessed, for example, through web browsers running on a personal computer or other computing device that exchange information through a communications protocol with a remote server that provides an interface to the search engine, and to web-site servers identified in search results Although great efforts have been made, and continue to be made, to provide Internet access through smaller hand-held electronic devices and mobile devices, such Internet access is constrained and complicated by the reduced functionality and screen size characteristic of smaller, less functional mobile devices. While a browser executing on a personal computer provides a generally large amount of screen space for displaying features, options, and results, the smaller, much lower-resolution display devices characteristic of mobile electronic devices, such as cell phones, generally requires cumbersome, multi-screen displays in order to provide the same functionality. Furthermore, alphanumeric character entry and function keys on a personal computer are large and easily manipulated by a user, while the very small and limited input devices associated with cell phones and other smaller electronic devices are difficult and cumbersome to use, and may require a large amount of additional navigation and input entry in order to carry out tasks than required to carry out equivalent tasks on a personal computer. In general, search engines must be accessed using a web browser, and, therefore, mobile devices and smaller electronic devices are required to provide some type of suboptimal, less-capable web-browser interface to the search engines in order to allow users to access search engines through these devices.

Figure 2:
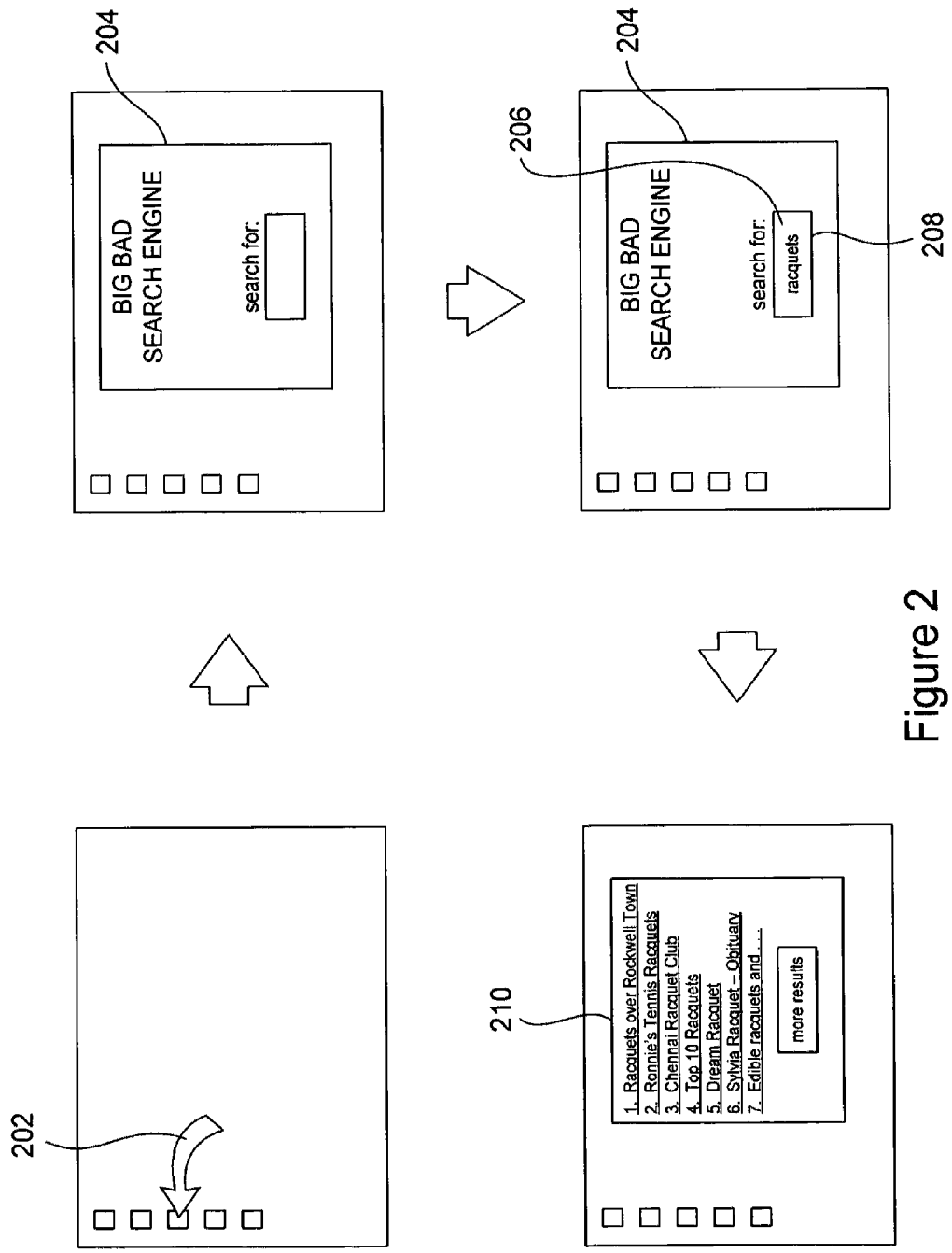

FIG. 2 illustrates access to information through traditional search engines. A user moves a displayed cursor 202, using a mouse, onto an icon on a computer screen to invoke display of a search-engine web page 204, and then inputs a text query 206 into a text-input window 208 displayed on the search-engine page 204 and depresses the enter key, or moves the cursor onto a search-invocation feature and inputs a mouse click, in order to transmit the query to the remote server providing the search-engine interface. The search engine carries out a query-based search of web pages available through the Internet and returns a list of annotated links as a result 210.

As shown in FIG. 2, accessing information through search engines involves multiple steps. Moreover, as those who use search engines are only too aware, search engines generally return a massive number of related links. Many simple queries, for example, may return thousands, tens of thousands, or more links that are potentially relevant to the user and that the user must then navigate to and peruse through additional operations. Search engines normally employ very complex and efficient indexing techniques in order to quickly carry out searches, and use a variety of different weighting, scoring, and prioritizing algorithms in order to sort the returned links in decreasing order of relevance, so that the initial links displayed to a user are generally the most relevant links with respect to the user's query. However, as those who use search engines well appreciate, it is often necessary to page through many returned results and access many web sites and web pages through the returned links in order to evaluate search results, and it is very frequently necessary to change the search query and carry out additional searches in order to iteratively discover an appropriately constructed search query that elicits a desired and manageable response by the search engine.

FIG. 3A illustrates the time constraints normally associated with information requests submitted to search engines and other electronic query-processing systems. In FIG. 3A, the horizontal arrow 302 represents a time line. When a user makes a request at a particular point in time 304, the search engine or other electronic query-processing system generally responds immediately 305, within milliseconds to a few seconds. In certain systems, a user can request that the same search be repeated 306-308 at some fixed time interval. However, because responses are normally provided as quickly as possible, the time-associated response behaviors of search engines are quite constrained. As one example, should a user request information not currently available or currently accessible to a search engine, the user must either configure some type of repeated, future search based on the same search request or must subsequently access the search engine and repeat the search at one or more later times. Furthermore, information retrieval is almost exclusively carried out by a request/response client/server protocol. Search engines generally do not provide unsolicited information to users.

As shown in FIG. 3B, search engines and other electronic query-processing systems and interfaces are generally constrained to searching for information from only one or a few types of information sources. For example, as shown in FIG. 3B, a search engine generally applies a query 310 to all of the web pages currently available on, and accessible to, the search engine 312 and returns a subset of those web pages 314 as the search result. There is, of course, an enormous amount of useful information available on the Internet. However, there may be many additional useful information sources that search engines cannot access. Moreover, search engines are currently restricted to alphanumeric text queries, and process those text queries word-by-word, generally without semantic understanding of the queries, instead relying on indexing and cumulative statistic measures in order to find web pages relevant to the query. However, those who use search engines are quite familiar with the limitations of this approach. Quite often, search engines return an enormous number of undesirable and irrelevant links to web pages for any particular search. In many cases, all of the words of a search may be found on web pages that are directed to quite different subjects and areas than the subject and area addressed by the query, as understood by humans and as might be understood by natural-language processing systems.

Figure 4A:
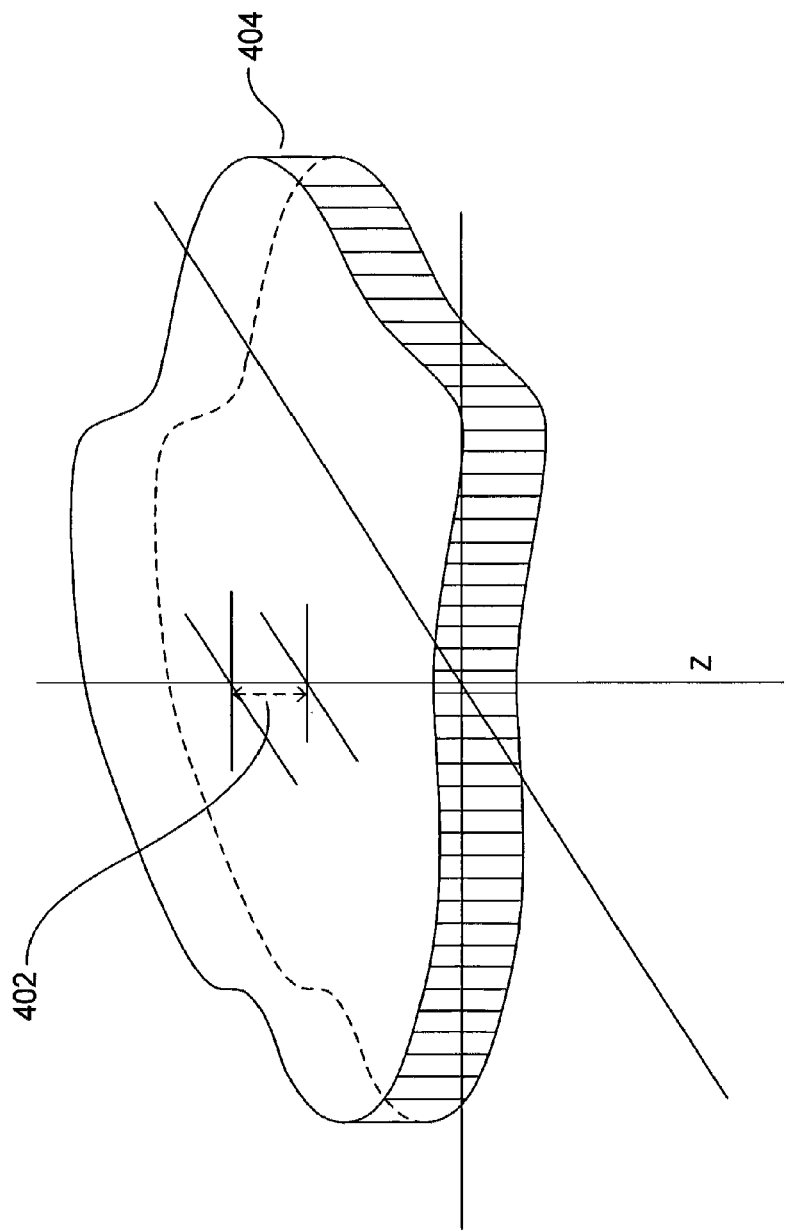
FIGS. 4A-C illustrate problems associated with the dimensionality of search queries.
Figure 4B:
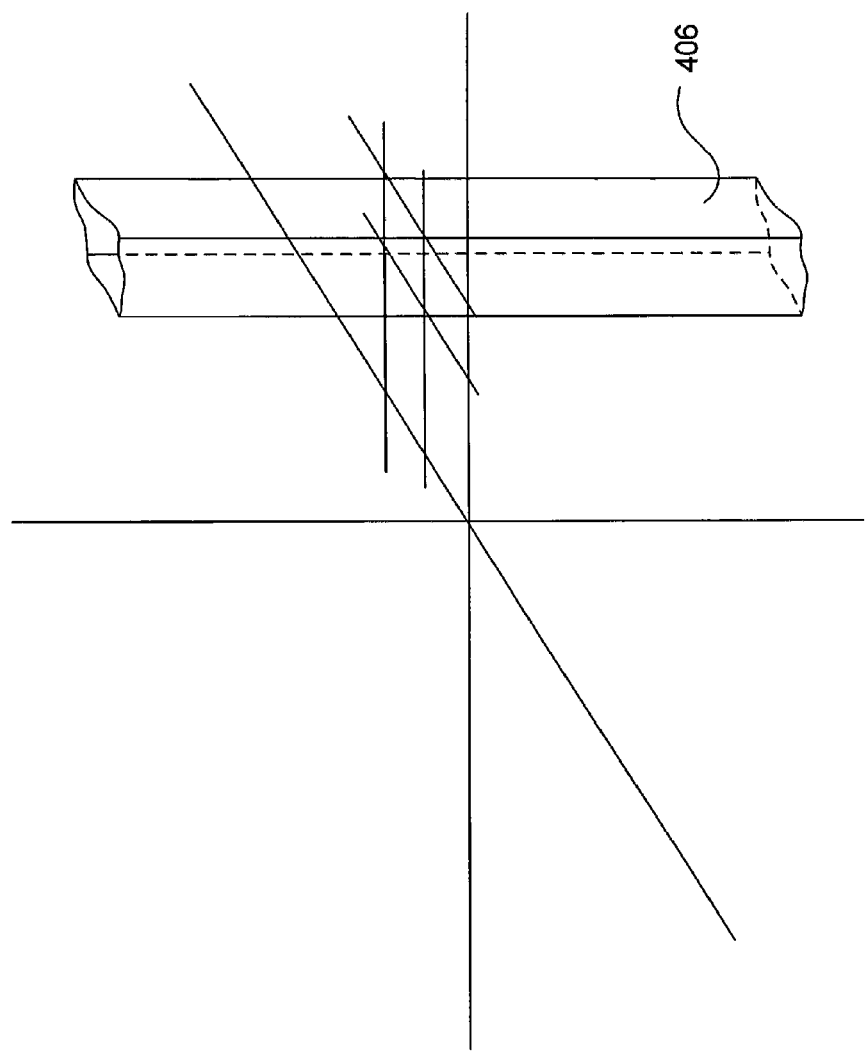
Figure 4C:
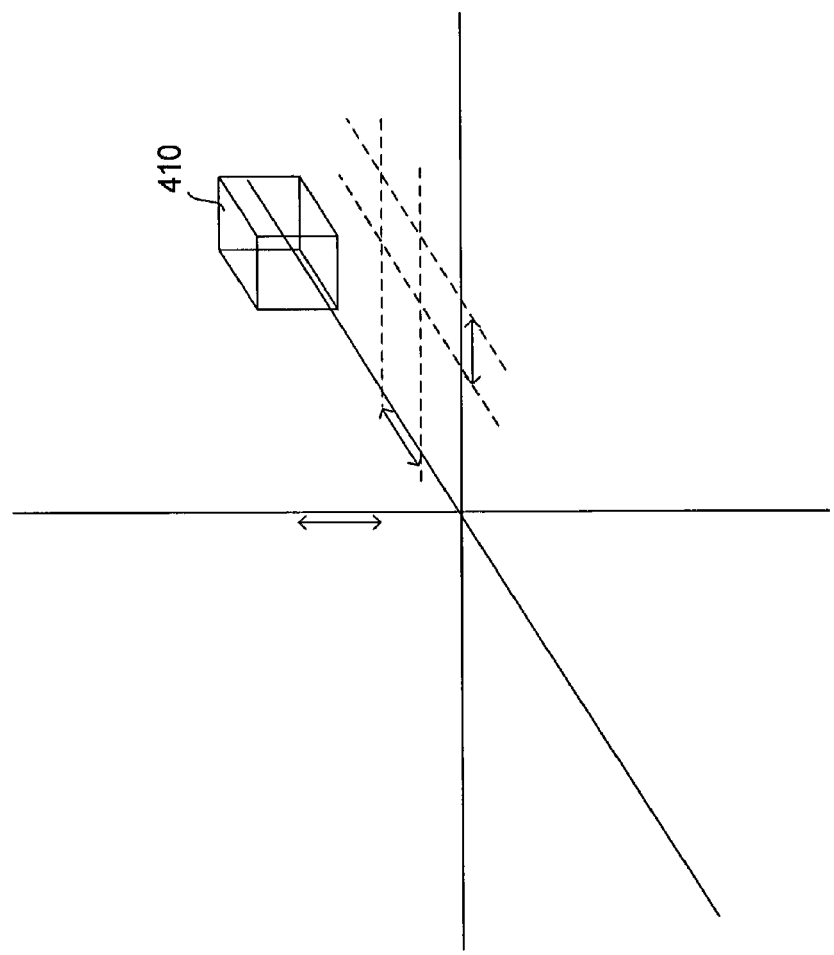

FIGS. 4A-C illustrate problems associated with the dimensionality of search queries. For any corpus of information, such as the web pages available through the Internet, information can be considered as a kind of hyper-dimensional volume associated with some number of dimensions. For example, web pages might be classified according to various sets of attributes, each set representing a dimension in some hyper-dimensional information space. Web pages can be classified, for example, according to dominant color, the presence or absence of photographic images, a human-assigned topic or set of topics, and other such attributes. When, as shown in FIG. 4A, a user can specify only one or a range of values with respect to a single dimension, even with relatively high specificity, as represented by the dashed arrow 402 in FIG. 4A showing a small range of values along the z axis, the returned search results, or information characterized by the one-dimensional query, can nonetheless represent a relatively large fraction of the three-dimensional information space 404. When a query can specify a range of values with respect to two dimensions, as shown in FIG. 4B, the specified volume of information space 406 may be still large and practically unbounded, but is generally smaller and better defined than when a range of values can be specified with respect to only a single dimension, as shown in FIG. 4A. When, as shown in FIG. 4C, a user may specify one value or a range of values with respect to all of the dimensions of information space, then the information so specified may be fully bounded and represent an arbitrarily small and manageable volume of information space 410. In higher dimensional spaces, the reduction in the volume of information space specified by a search query that is obtained by increasing the number of dimensions with respect to which values or ranges of values can be specified is vastly more dramatic than in the simple, three-dimensional example shown in FIGS. 4A-C. Therefore, it is a fundamental principle of information searching and information retrieval that the more types of information that can be included in queries, the more precisely selective the queries can be made.

In a certain respect, search engines and many query-processing systems are somewhat one dimensional. The queries are restricted to alphanumeric character strings, regardless of the length of strings that can be input. Search engines and query-processing systems generally parse the query strings into words and numerals and then use the words and numerals in complex indexing schemes to find documents that contain the greatest number of occurrences of the individual words and numerals, with higher weights assigned to co-occurrence of the words and numerals within sentences, paragraphs, or pages of the documents. It is this one-dimensionality of traditional search engines and query-processing systems that leads to the relatively large search results returned to users. Of course, with practice, users can often formulate quite specific and well-targeted queries. However, for many general questions, the returned result sets are unavoidably large, and generally do not well correspond to the results desired by the user.

Figure 5:
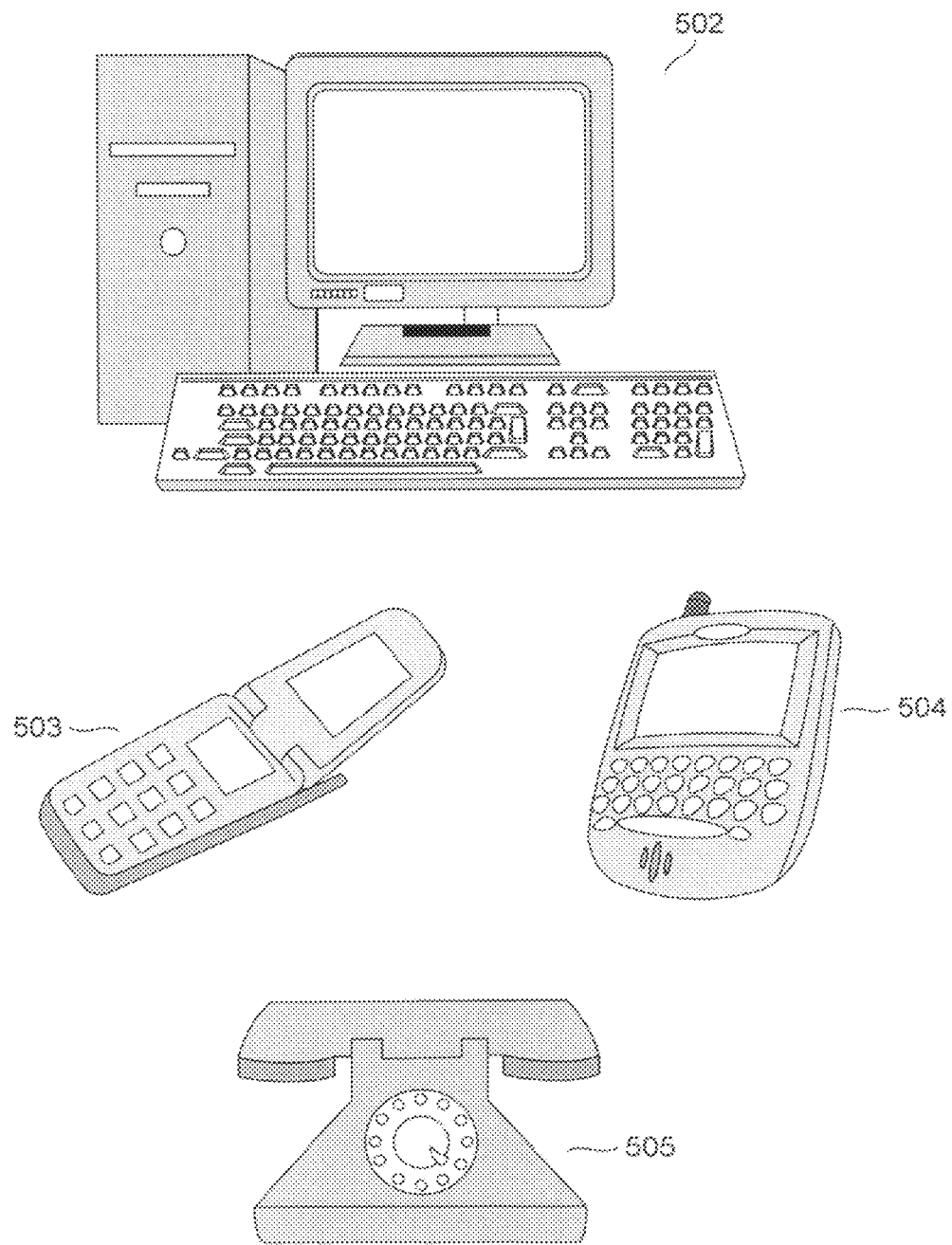
FIGS. 5-6 illustrate the relaxation of constraints and limitations desired by users, developers, and vendors of information-search and information-retrieval systems.
Figure 6:
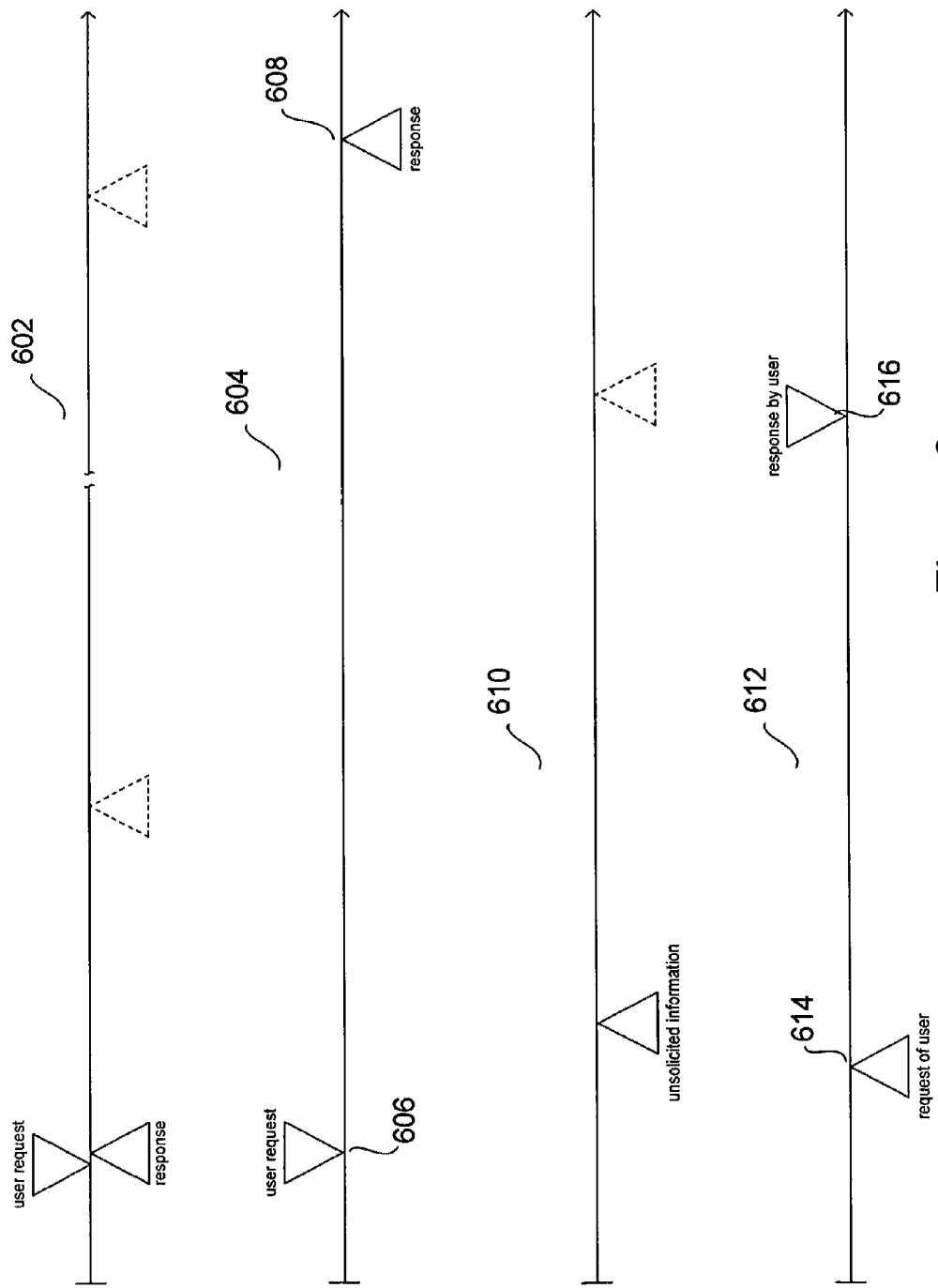

FIGS. 5-6 illustrate the relaxation of constraints and limitations desired by users, developers, and vendors of information-search and information-retrieval systems. As shown in FIG. 5, users desire access to information-search and information-retrieval systems through personal computers 502, but additionally desire efficient access from cell phones 503, personal digital assistants 504, and even, at least in part, through normal telephones 505 and other communications devices. As shown in FIG. 6, while the standard request/response client/server protocol for information search and retrieval 602 remains desirable, a relaxation in the time constraints is most useful and desirable to many users. For example, as shown with respect to the time line in 604 in FIG. 6, a user may wish to be able to enter a request at one point in time 606 and receive a response at some subsequent point in time 608 relatively far removed, in time, from the time of the request. This relaxation of time constraint may facilitate comprehensive searching, may enable the information-search-and-retrieval service to search until the desired information is found, even if that information only becomes available subsequently, and may allow the user to request information in advance the user's need for that formation, or at a time when the user has an ability to easily and efficiently access the information. As shown with respect to timeline 610, users may also desire an information-search-and-retrieval system to provide various types of unsolicited information to the user, over time, as the information-search-and-retrieval system learns about the user's preferences and needs. For example, the user who frequently searches for concert tickets for a particular genre of music may appreciate being notified of upcoming concerts, without having to repeatedly and frequently search for that information. As illustrated in FIG. 6 with respect to time line 612, it may also be useful for the information-search-and-request system to be able to request information from users 614 and receive from users responses to information requests 616, in essence reversing the normal request/response protocol. For example, the information-search-and-retrieval system may request information from a community of users on behalf of a particular requesting user, or may request information from an individual user in order to better learn about the user's needs and desires for information.

Figure 7:
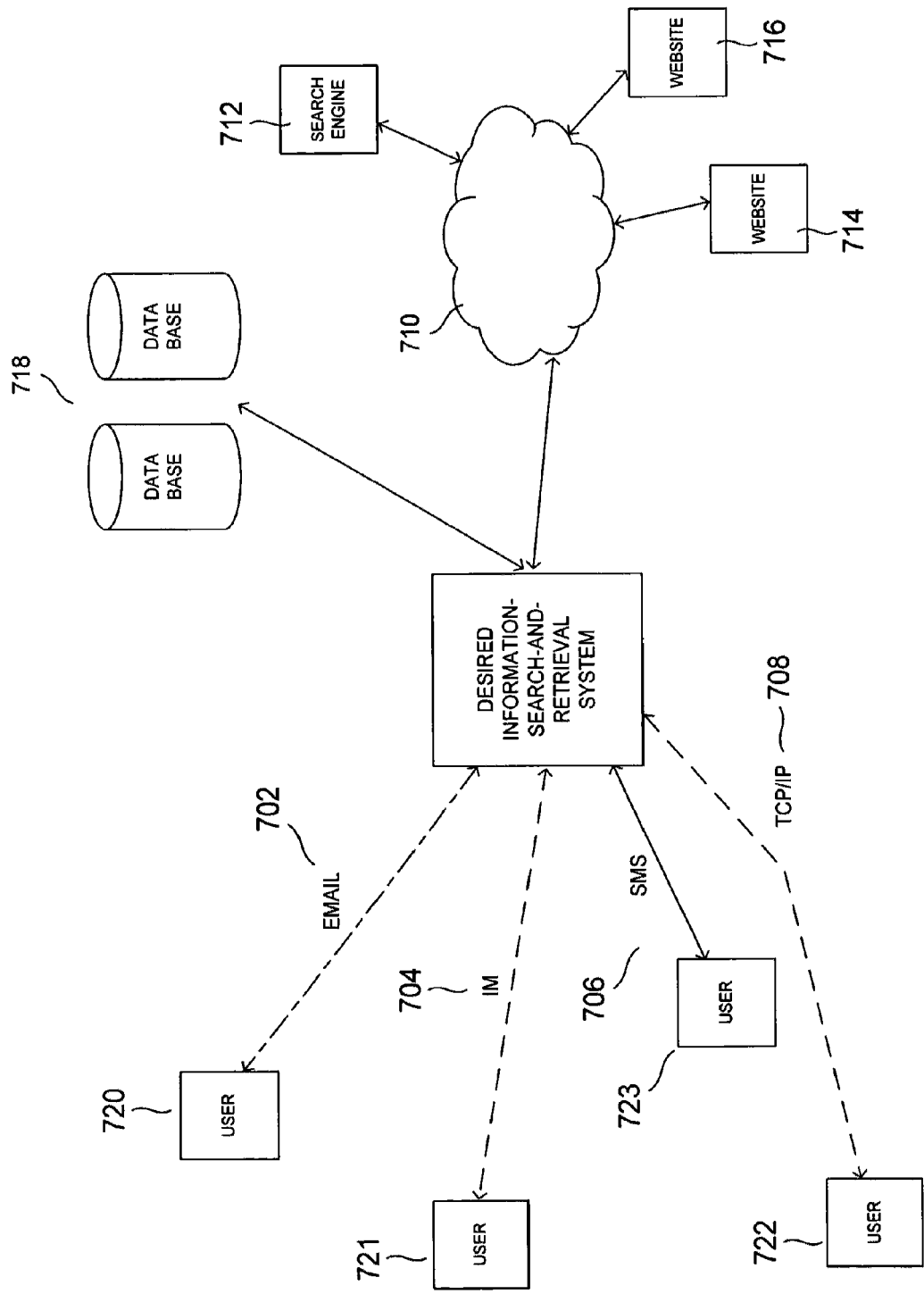
FIG. 7 illustrates desired characteristics of a more flexible, less constrained information-search-and-retrieval system.

FIG. 7 illustrates desired characteristics of a more flexible, less constrained information-search-and-retrieval system. As shown in FIG. 7, users may wish to access information via many different types of communications media, using different types of devices. Communications media may include email 702, instant messaging 704, SMS test messaging 706, traditional TCP/IP protocol over computer networks 708, and multimedia messages ("MMS"). Users may desire to request information for one type of communications medium, and receive a response to that request through a second type of communications medium. In searching for information, it would be desirable for the information-search-and-retrieval system to be able to access web pages and web sites through the Internet 710 and traditional search engines 712, access certain web sites and web pages directly 714 and 716, access many other types of electronically encoded and stored information, including information stored in databases 718, and access other users of the user community 720-723 for information. Furthermore, in formulating search queries on behalf of users, it is desirable for the information-search-and-retrieval system to be able to employ many different types of information, including detailed information about a user, date and time information, information gleaned from the history of information searches carried out by the user, stored user preferences, and many other types of information in order to find only highly relevant information corresponding to an information request to return to the user.

Embodiments of the present invention provide the relaxation of constraints and limitations, discussed above with reference to FIGS. 5-7, in an information-search-and-retrieval system referred to as an "automated concierge system." In order to relax the various time constraints associated with traditional search engines and query-processing systems, the automated concierge systems that represent embodiments of the present invention are most generally accessed by email or other message-based interfaces, rather than through a web-browser interface or traditional graphical-user interface. Email is an asynchronous communication system. Users may receive unsolicited email and send email without the expectation of an immediate response. Furthermore, email is far more conveniently prepared and transmitted on various different types of electronic devices, including cell phones and personal digital assistants, than preparation and transmission of alphanumeric text queries through web-browser-provided search-engine interfaces. Moreover, email generally provides a less constrained, or flexible medium for requesting information. Users may type information requests in natural language and may provide various types of attachments, including photographs, forms, and output from various types of programs, all of which can potentially be accessed and employed by the automated concierge system to find requested information on behalf of users.

The automated concierge systems that represent embodiments of the present invention can access the Internet either directly, through databases of stored links and references, or through traditional search engines. In addition, the automated concierge system may directly access service providers through alternative means, including standard telephone interfaces, and may access many additional types of information not available through the Internet, including various electronic databases that stored information collected by the automated concierge system, databases that describe a user's preferences and information-access histories, information concerning a user's location, accessing device, and the date and time of a user's request available from fields of email messages and databases maintained by the automated concierge system. All of this information allows the automated concierge system to employ many additional information dimensions in formulating general search queries in addition to standard alphanumeric text strings. Furthermore, because email may be used interactively, the automated concierge system can interact directly with a user in order to solicit additional information and search criteria to narrow searches on behalf of users in order to provide smaller, more relevant, and more manageable information responses. Because email and other message-based communications protocols are interactive and asynchronous, the automated concierge system can conduct a dialog with a user, during the course of responding to an initial information request from the user, in order to obtain sufficient search criteria to other information to construct efficient queries on behalf of users. Moreover, such dialogs can be additionally used to obtain information which the automated concierge system can use to conduct dialogs with services providers on behalf of users in order to obtain services on behalf of users. Messaging services, and efficient interfaces to messaging services, are provided on a wide variety of different types of electronic devices that intercommunicate through various types of communications media. For example, messages can be sent and received using mobile cell phones via the SMS text-message protocol. Messaging services are provided on personal computers through resident applications, such as Microsoft Outlook, via web services, such as Google's Gmail, through instant-messaging services, file-sharing protocols, and by additional means and services.

FIGS. 8A-E provide exemplary information-search and information-retrieval transactions between a user and the automated concierge system that represents one embodiment of the present invention. These exemplary transactions are, by no means, an exhaustive list of transaction types, but instead serve to show the utility and flexibility provided by the automated concierge system.

Figure 8A:
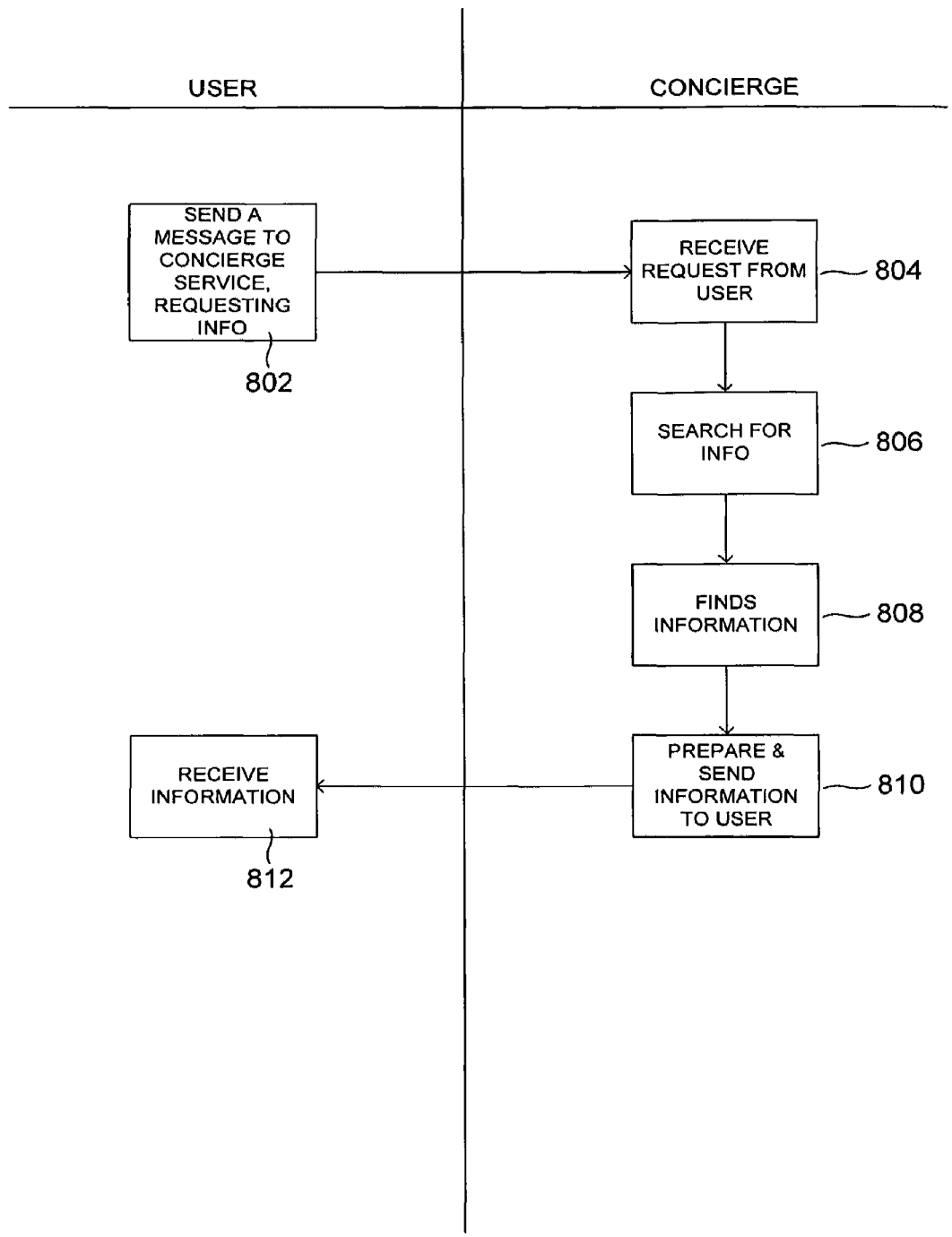
FIGS. 8A-E provide exemplary information-search and information-retrieval transactions between a user and the automated concierge system that represents one embodiment of the present invention.

FIG. 8A illustrates a simple information request. FIG. 8A, like the remaining FIGS. 8B-E, is divided into two parts, with user actions shown in a left portion of the figure and automated-concierge-system actions shown on the right portion of the figure. For a simple information request, a user employs a messaging service provided on a user's electronic device to compose and send a message to the automated concierge system requesting information 802. The automated concierge system receives the request message 804 and, in response, searches for the requested information 806, finds a reasonable amount of relevant information 808, and packages the information into a return message that the automated concierge system sends back to the user 810. The user receives the information in a reply message 812. The user may elect, either relying on stored preferences or configuration information previously submitted to the automated concierge system, or by including directives in the original information-inquiry message, to have the information transmitted to the same device, from which the information request was transmitted, or to another of the user's devices. For example, a user may transmit an information request from a mobile phone to the automated concierge system, and receive a response to the request at some later time on the user's personal computer. Depending on the implementation of the automated concierge system, a user has wide latitude in constructing the information request. For example, in many cases, the user may simply type a natural-language request that can be processed by the automated concierge system in order to determine the nature of the information requested by the user. Alternatively, the automated concierge system may specify various different ways and various different formats that a user may employ to format information requests to facilitate parsing processing of the request by the automated concierge system. As one example, the automated concierge system may provide template request messages containing formatting information and delineating text-entry positions. Note that the time between sending of the request message and receiving a response from the automated concierge system is not bound by the traditional request/response protocols used by search engines and other electronic query-processing systems. A user may desire the information to be provided at a later time, convenient for the user. Alternatively, in certain cases, the user may require an immediate response, or may require an immediate partial response with additional information provided later. Due to the asynchronous nature of messaging, a response to an information request can occur at any time subsequent to the request, and may occur in one or multiple messages. In certain cases, the timing and number of messages used for responding to information requests may be specified by the user, either in the information-request message, or by various user preferences and directives stored on behalf of the user by the automated concierge system.

Figure 8B:
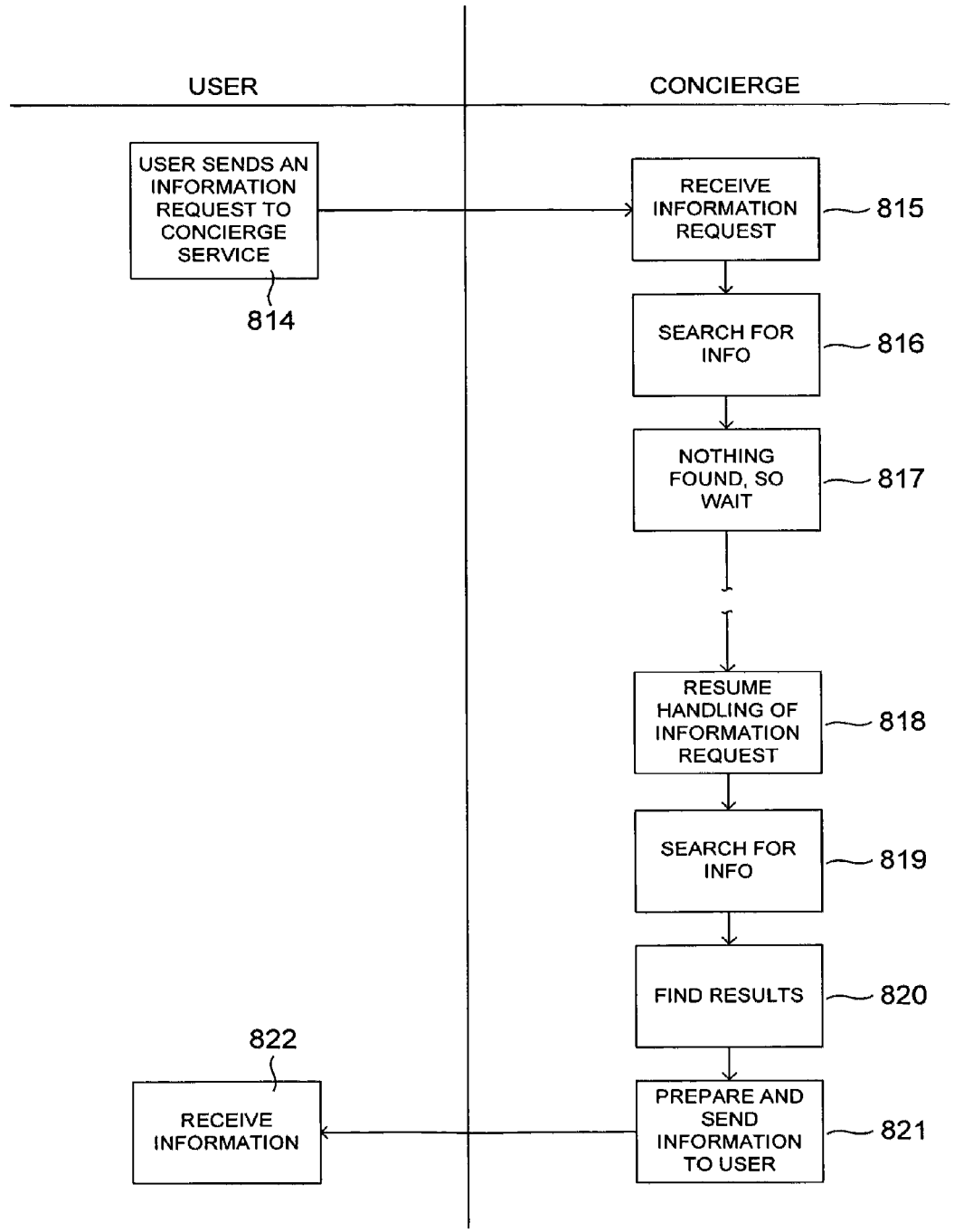

FIG. 8B illustrates a simple information request followed by a delayed response from the automated concierge system. The user sends an information request to the automated concierge system, which receives the request 815, searches for the requested information 816, but, finding no information to return, sets the timer and waits to repeat the request at a subsequent time 817. Following timer expiration, the automated concierge system resumes handling the information request at a later time 818 by again searching for the requested information 819. At this point, results of the search produce useful information for the user 820, which is packaged in a reply message and returned to the user 821. The user receives the reply message 822 hours, days, weeks, or even months after the original request. To facilitate such deferred or delayed responses, users may specify that special folders or containers for messages be created for, and used by, the automated concierge system so that the user can quickly find information-request and service-request responses, rather than needing to sort through a large volume of incoming messages.

Figure 8C:
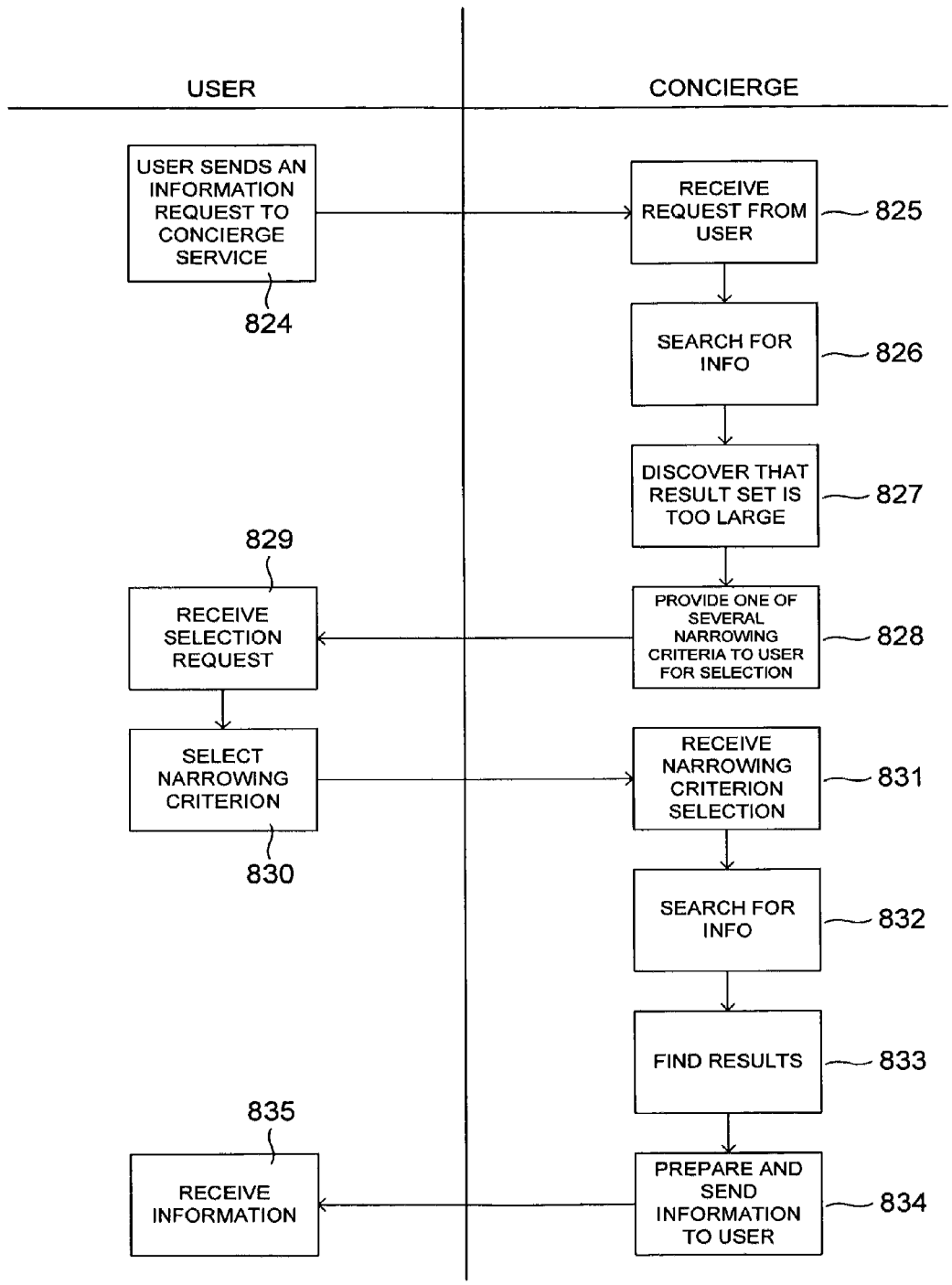

FIG. 8C illustrates a simple message-exchange dialog between a user and an automated concierge system in order to prepare and execute an efficient information search on behalf of the user. The user sends an information request to the concierge service 824 which receives the request 825 and searches for the requested information 826. In this case, the automated concierge system discovers that the result set obtained from executing the search is too large 827 and therefore devises a list or set of narrowing criteria from which the user can select additional search criteria to narrow the search, sending a selection request to the user 828. The user receives the selection request 829 and selects one of some number of narrowing search criteria 830, returning the selection in a message to the automated concierge system. The automated concierge system receives the selection of narrowing search criteria 831, uses the narrowing criterion or criteria along with the original search request to again search for information 832, and, finding an appropriate quantity of information as a result of the searching 833, returns the information to the user 834. The user receives the requested information in a reply message 835.

Figure 8D:
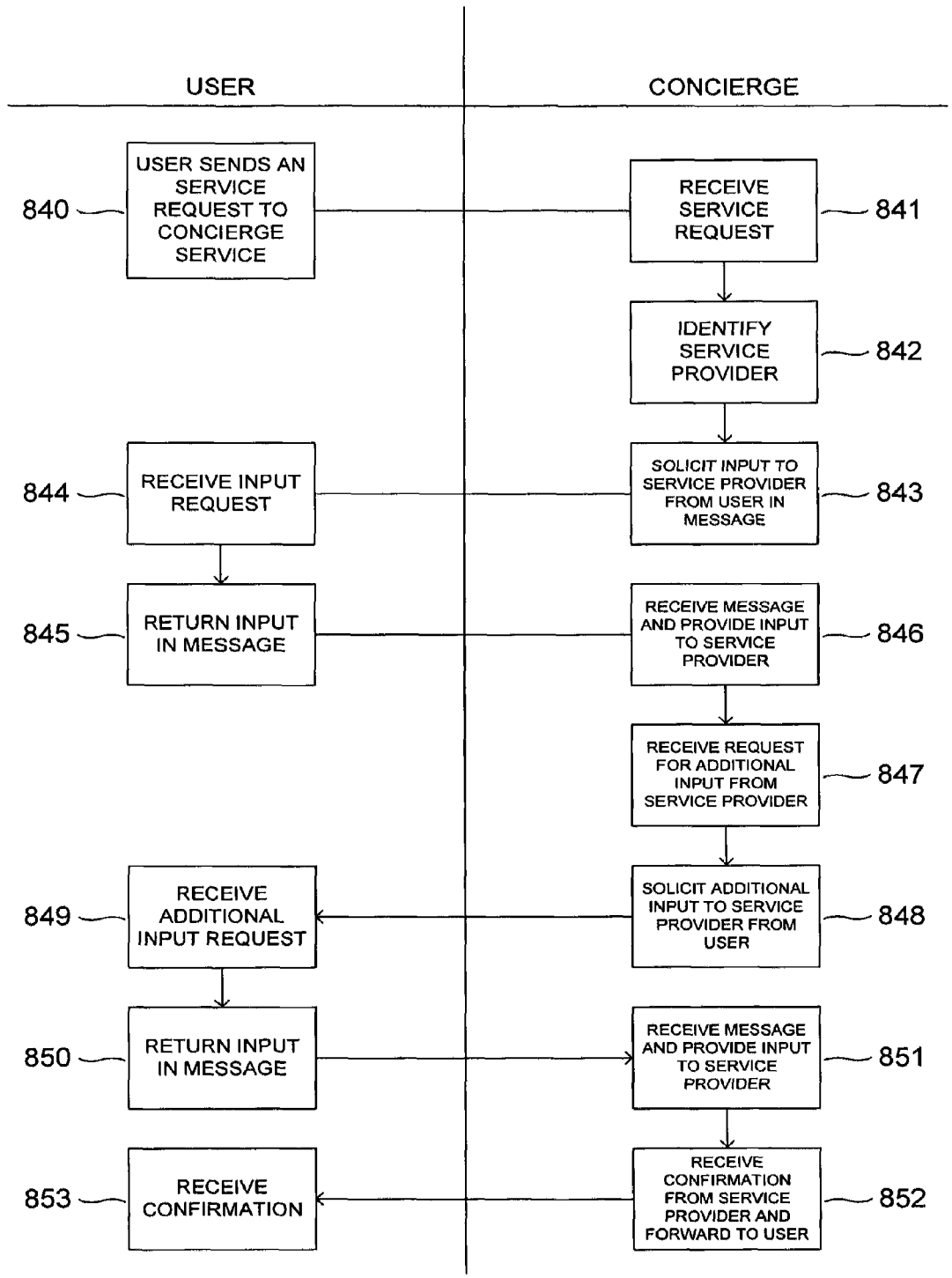

FIG. 8D illustrates a user request for service provision to the automated concierge system. The user prepares a service request and transmits the service-request message to the automated concierge system 840. The automated concierge system receives the service-request message 841, and uses information within the message to identify an appropriate service provider on behalf of the user 842. Automated concierge system then determines additional information needed to access service provision from the service provider, either by contacting the service provider or by using stored information related to the service provider, and sends a message to the user to request this information 843. The user receives the input-information request 844 and provides the requested input information in a reply message 845 returned to the automated concierge system. The automated concierge system receives the input information from the user 846 and transmits that information to the service provider. In response, the service provider may request additional information from the automated concierge system 847. The automated concierge system, in turn, prepares and sends a request for the additional information 848 to the user, who receives the request for additional information and returns the requested information in a reply message 850 to the automated concierge system. The automated concierge system receives the user's additional information and submits the information to the service provider, in this case, receiving confirmation of service provision from the service provider 852 and forwarding that confirmation to the user. The user receives the confirmation in a final response message 853.

One example of service provision would be a user requesting purchase of tickets or rental of a rental car, and the automated concierge system carrying out the requested transaction on behalf of the user. The automated concierge system may store information provided by the user for carrying out such transactions, such as credit card numbers, identification information, and other information, in order to decrease the number of back-and-forth messages required to collect the information required for any particular transaction. Service provision by the automated concierge system may provide enormous benefits to a user. For example, a user may wish to order a book while shopping in a book store, and can do so by mobile telephone rather than waiting to return home and conducting the transaction via the Internet. As another example, a user, while traveling and lacking information for a transaction, may request that the automated concierge system carry out the transaction on behalf of the user, and conveniently receive provision of a service that would otherwise be unavailable to the user.

Figure 8E:
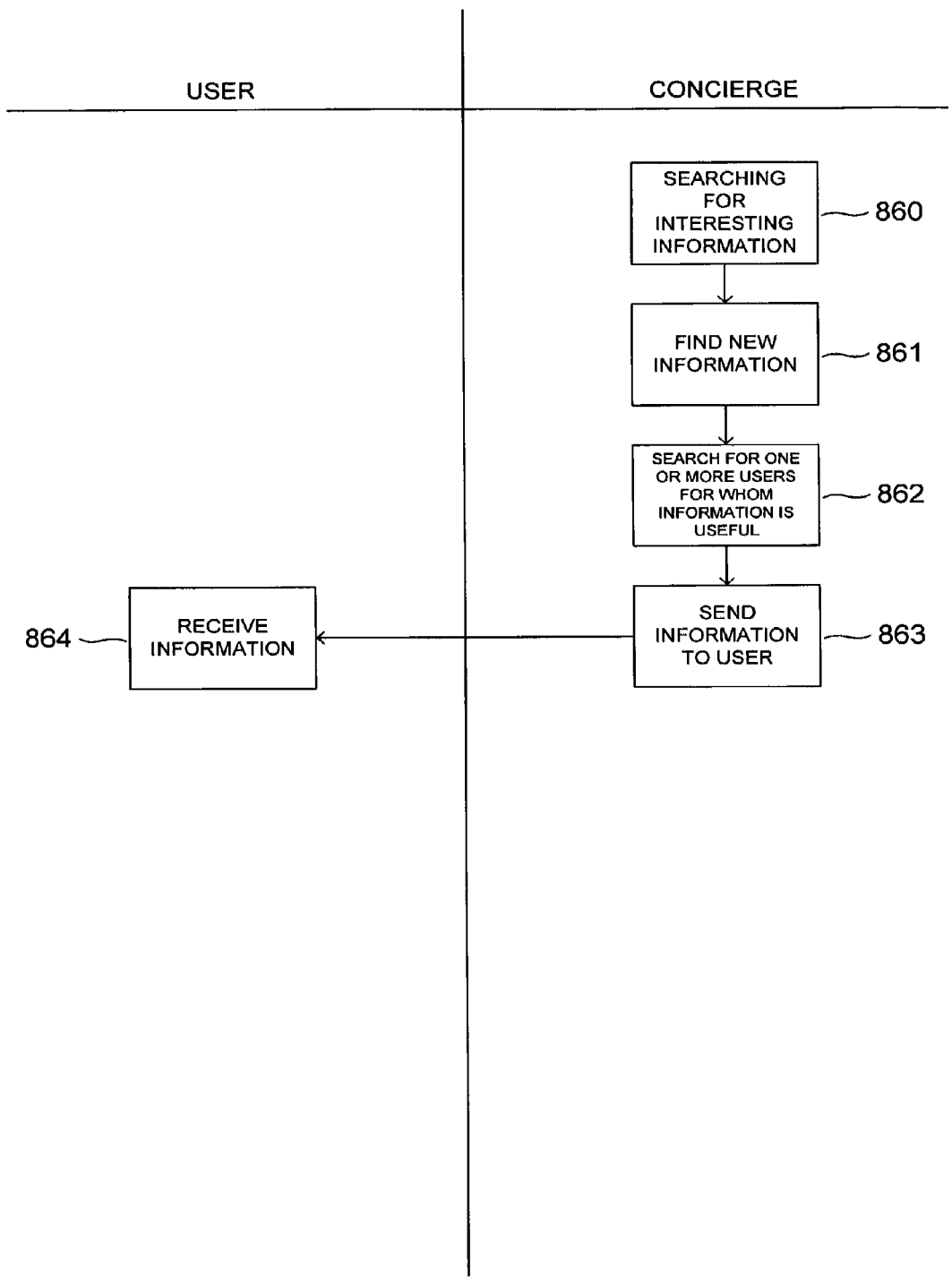

Finally, FIG. 8E shows transmission of information to a user by the automated concierge system without having first received an information request. The automated concierge system may continuously search for interesting information 860, whether or not in response to particular requests. When interesting new information is found by the automated concierge system 861, the automated concierge system may then search for one or more users of the automated concierge system for which the information may be desired or useful 862. The automated concierge system may then send unsolicited information messages to those users 863 which receive the unsolicited information as, for example, email messages on a personal computer 864. The ability for the automated concierge system to contact users without having first been contacted by users provides enormous, increased flexibility in information provision to users. Again, users may control the types of information received in unsolicited information messages from the automated concierge system, the frequency of such unsolicited information messages, and other such parameters and characteristics of unsolicited information provision.

Figure 9:
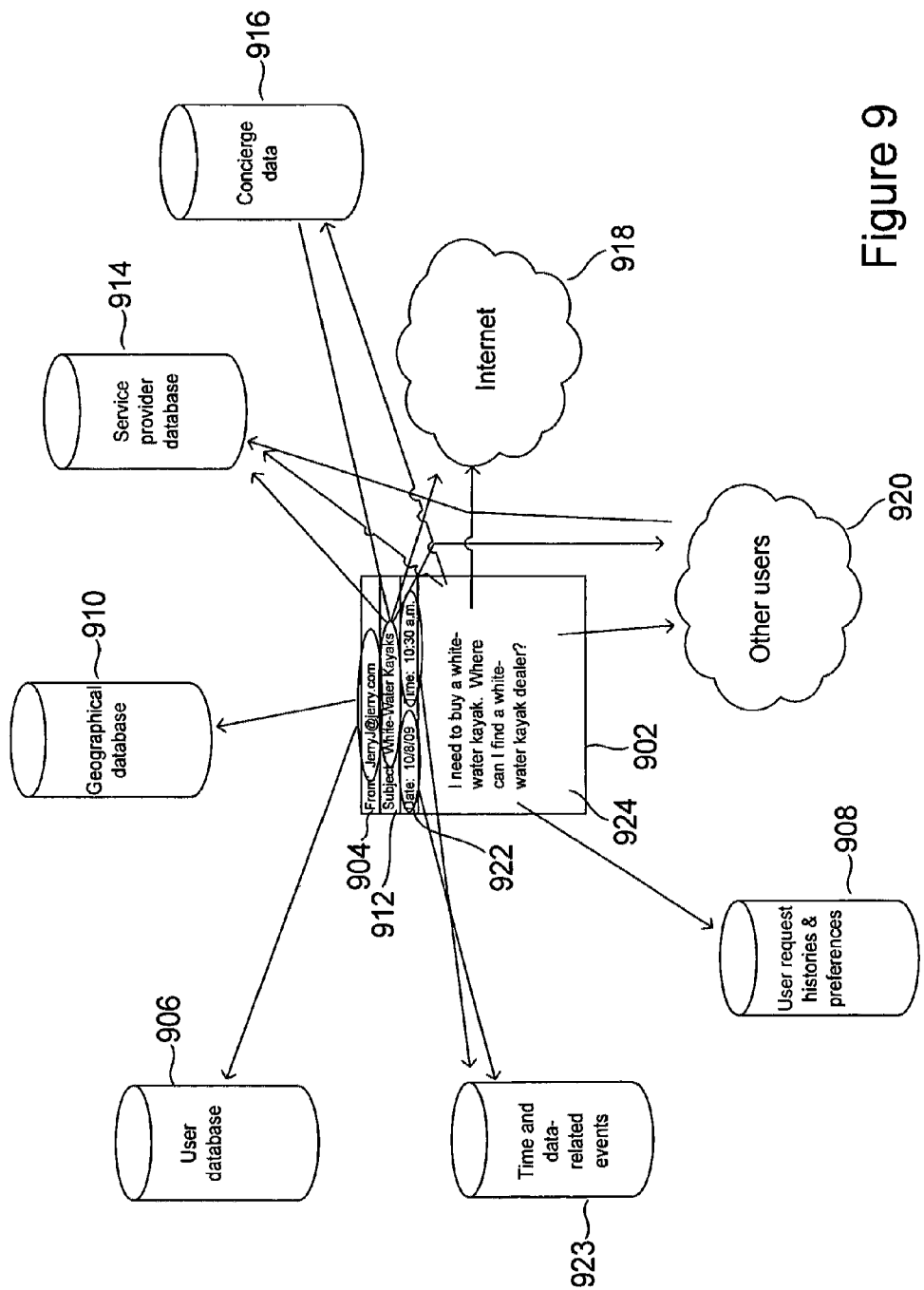
FIG. 9 illustrates the wider variety of search criteria available to an automated-concierge-system embodiment of the present invention, in contrast to traditional search engines and query-processing interfaces, as well as the greatly increased volume of information that can be searched by automated-concierge-system embodiments of the present invention.

FIG. 9 illustrates the wider variety of search criteria available to an automated-concierge-system embodiment of the present invention, in contrast to traditional search engines and query-processing interfaces, as well as the greatly increased volume of information that can be searched by automated-concierge-system embodiments of the present invention. In FIG. 9, a simple information-request message 902 is shown as received by an automated concierge system. The automated concierge system accesses, parses, and processes a variety of different information fields within the message. For example, the message generally includes the messaging address of the user 904, allowing the automated concierge system to access a database of user information to identify the user and obtain information about the user 906 as well as access stored histories of user interactions and preferences 908. Thus, the automated concierge system may immediately access a relatively large amount of user-specific information to assist in interpreting and responding to the information request. By contrast, search engines and other query-processing systems typically store little or no information about users. The information also may include geographical information stored in a geographical database 910 regarding the current geographical location of the user determined from the user's message address, when possible.

Information-request messages may contain a subject field 912, which allows the automated concierge system to access many different sources of information related to the subject matter of the request, including service-provider databases 914, enormous amounts of information stored by the concierge service 916, information available on the Internet 918, and even information provided by other users of a user community 920.

The information-request message may include date 922 and time 924 fields, allowing the automated concierge system to access databases 923 that include stored information and upcoming events indexed by date and time. Finally, the actual request, stored in the body of the information-request message 924, can be processed by the automated concierge system to generate multiple queries and search criteria that the automated concierge system may employ to separately access a wide variety of different databases and other information sources, including traditional search engines via the Internet and information provided by other users of the user community. Therefore, again, automated concierge system can access a far greater amount of information than traditionally accessed by search engines or query-processing systems, and can do so using many more different types of search criteria and user-specific information available to the automated concierge system.

One large difference between the automated concierge system and the traditional search engines and query-processing systems is that the automated concierge system can save state information describing users as well as state information describing each individual search request, unlike the largely stateless search engines and query-processing systems. Because the automated concierge system maintains state information both about users and about information requests, far greater flexibility in searching and responding to user requests is possible. As discussed above, responses may be immediate, but may also be delayed, until a time convenient to the user or until the information can be obtained by the automated concierge system. Over the course of many interactions, the automated concierge system may learn a great deal of information about users, and may use that information to efficiently carry out information searching on behalf of the user. The automated concierge system may monitor the time of the day, the user's geographical location, various trends and patterns in a user's interactions as well as in other users' actions to provide more relevant results to information requests. As discussed above, the automated concierge system may receive requests and respond to requests over a variety of different communications media, thus allowing users to issue information and service requests and to receive responses through various different devices at different times and in different locations.

FIGS. 10A-L provide control-flow diagrams that illustrate the principles of implementation of one embodiment of an automated concierge system according to the present invention. An automated concierge system may be relatively large and complicated, with many implementation details related to the types of messaging interfaces supported by the automated concierge system, the types of natural-language processing abilities available to the automated concierge system, the types of information accessed by the automated concierge system, and other such parameters and characteristics. Many of these implementation details can be borrowed from other types of systems and implementations and/or are well known to those skilled in the art of automated computing systems. The intent of the exemplary implementation provided in FIGS. 10A-L is to illustrate how the implementation of an automated concierge system may be organized, rather than to delve into widely available details concerning various types of messaging interfaces and information sources.

Figure 10A:
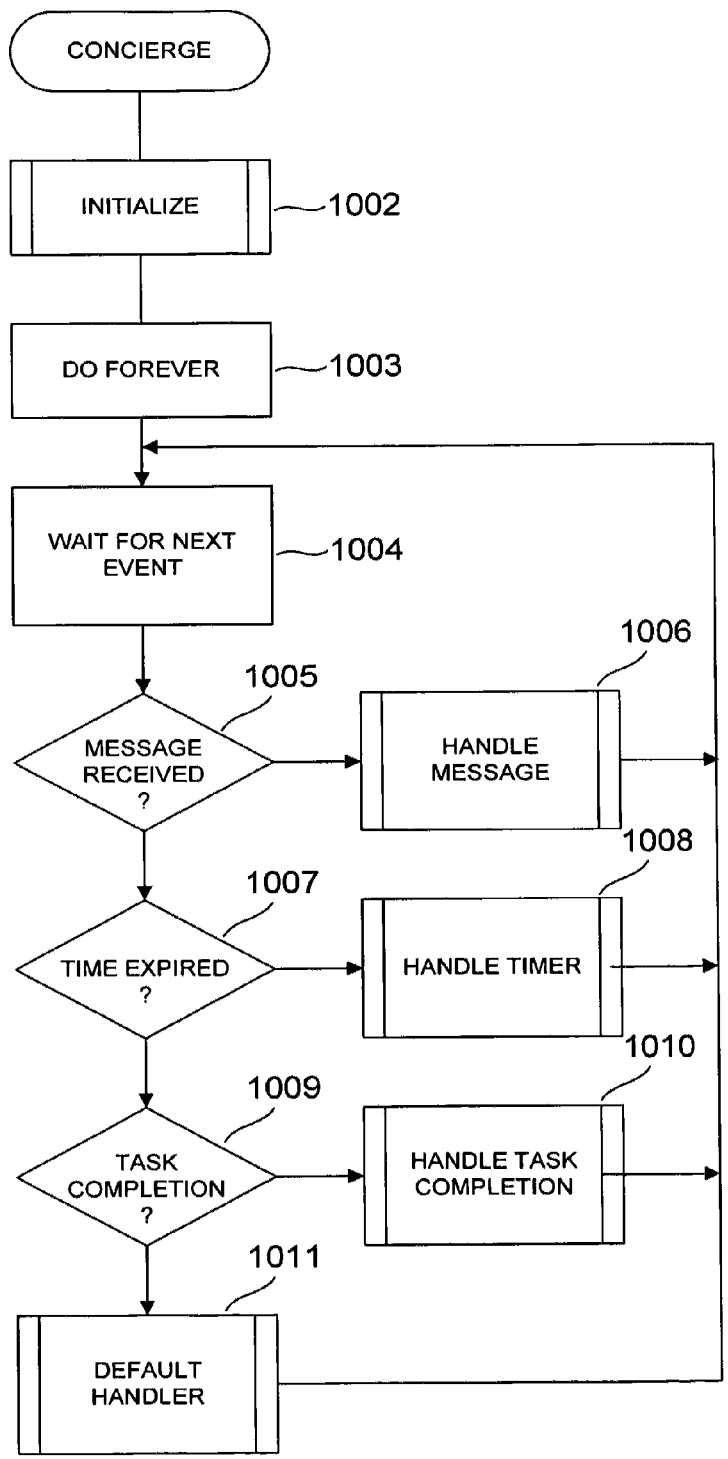
FIGS. 10A-L provide control-flow diagrams that illustrate the principles of implementation of one embodiment of an automated concierge system according to the present invention.

FIG. 10A illustrates the event-processing core of an automated concierge system. In step 1002, the automated concierge system is initialized. Initialization may be a relatively complex process, in certain embodiments of the present invention, or may be relatively simple and straightforward, in other embodiments. Initialization may involve linking to various types of information sources, creating various different types of databases, or reconnecting to already created databases, launching various on-going search tasks, and other such initialization activities. An automated concierge system, at a highest level, is implemented as an endless loop comprising steps 1003-1011 in which the automated concierge system waits for events to occur, in step 1004, and responds to each event in steps 1005-1011. In parallel with the continuous event-handling loop shown in FIG. 10A, the automated concierge system carries out information searches, dialogs via messaging services with users, and many other tasks. FIG. 10A shows explicit handling of three different types of events: (1) received messages, detected in step 1005 and handled via a call to a message handler in step 1006; (2) timer expirations, detected in step 1007 and handled in a call to a timer handler in step 1008; and (3) task-completion events, detected in step 1009 and handled by a call to a task completion handler in step 1010. Other types of events that may occur and be detected are handled by a default handler 1011. The many other types of events handled by the default handler may include events associated with administration and management interfaces provided to system managers and administrators, many different types of error events associated with communications systems and computing platforms, performance-monitoring events, and many other additional types of events. Again, FIGS. 10A-L are intended to show the general implementation of an automated concierge system, rather than particular details with regard to system administration, error handling, and many other such implementation details.

Figure 10B:
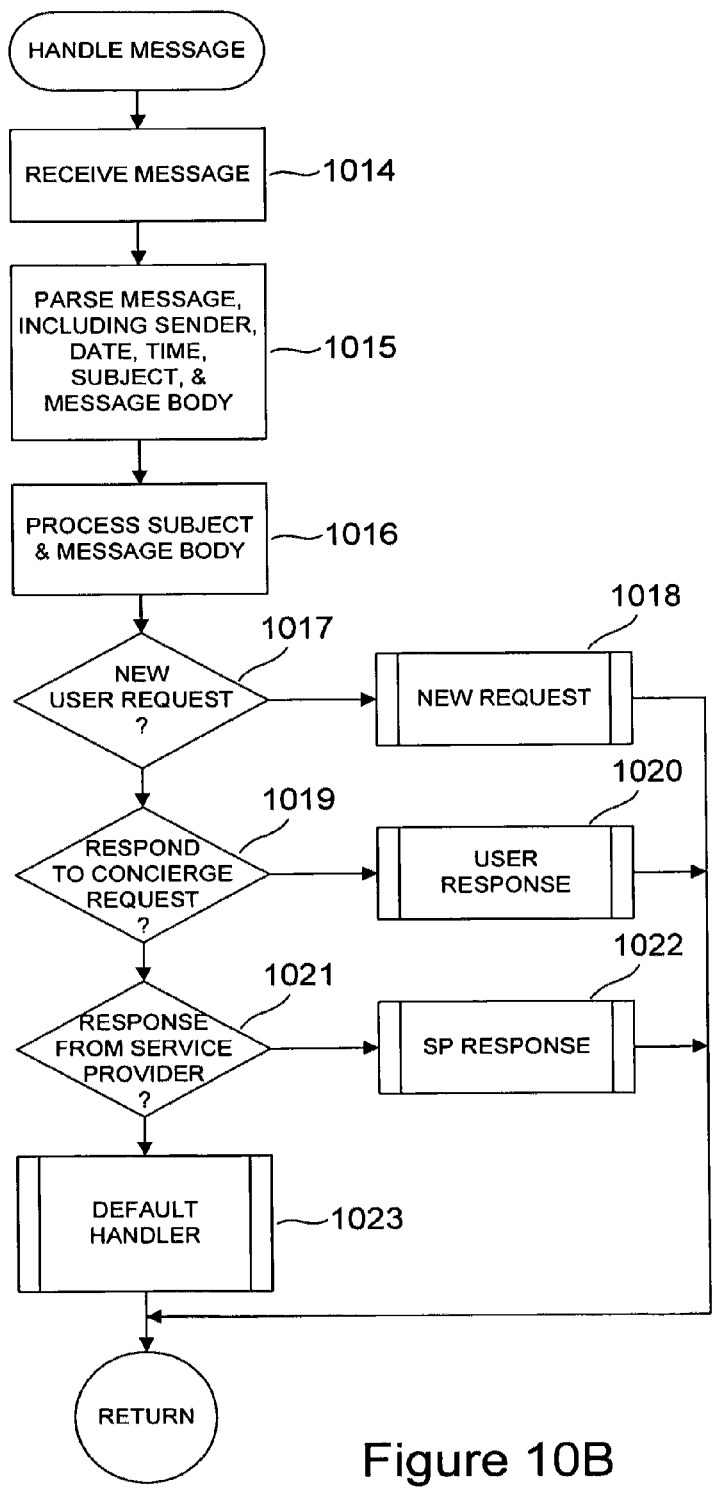

FIG. 10B provides a control-flow diagram for the message handler called in step 1006 of FIG. 10A. In step 1014, a message is received via a message interface provided by the computing platform and messaging services running on the computing platform from which the automated concierge system is executed. In step 1015, the information in different fields of the message is extracted and parsed, and, in step 1016, the message body and subject fields are processed, via template-related processing, natural-language processing, or other such information-processing techniques in order to determine the type of message received. If the message is a new information request from a user, as determined in step 1017, then a "new request" routine is called in step 1018. If the received message is a response to an automated concierge system request message, as determined in step 1019, then a "user response" routine is called in step 1020. If the message is a response from a service provider, as determined in step 1021, then an "SP response routine is called in step 1022." Many of various other types of messages are handled by a default handler 1023.

Figure 10C:
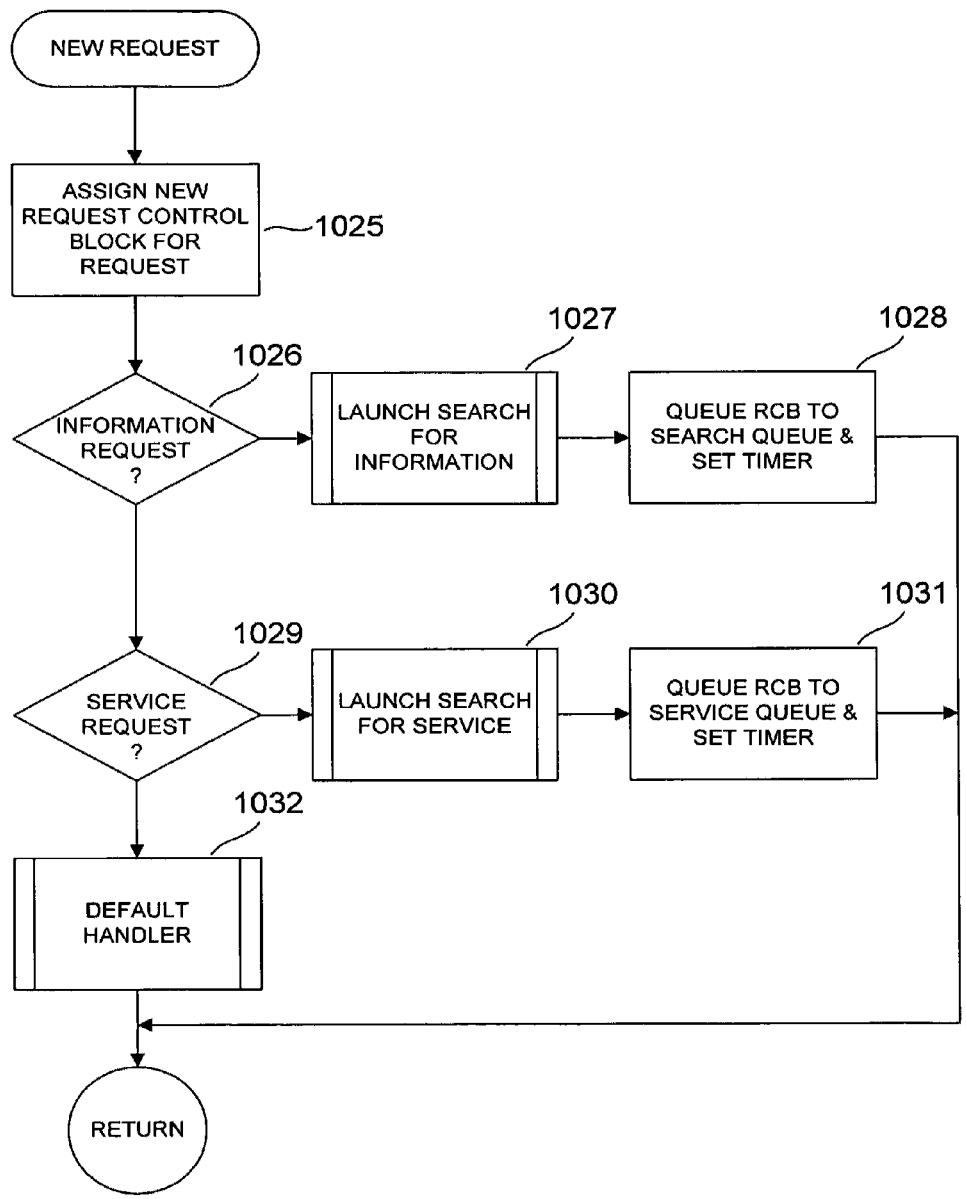

FIG. 10C provides a control-flow diagram for the "new request" routine called in step 1018 of FIG. 10B. In step 1025, the routine assigns a new request control block ("rcb") for the request. The rcb essentially represents state information for the request, and may include an identifier for the user, a date and time, original search criteria, information concerning the number of searches launched by the automated concierge system to satisfy the request, an associated timer, and many other such types of information. In the case that the request is an information request, as determined in step 1026, the routine launches a search for information via a routine call in step 1027 and then queues the rcb to a search queue and sets an associated timer in step 1028. If the request is a request for service provision, as determined in step 1029, then a routine is called, in step 1030, to launch a search for service provision, and the rcb is queued to a service queue and an associated timer is set in step 1031. Other types of requests are handled by a default handler in step 1032.

Figure 10D:
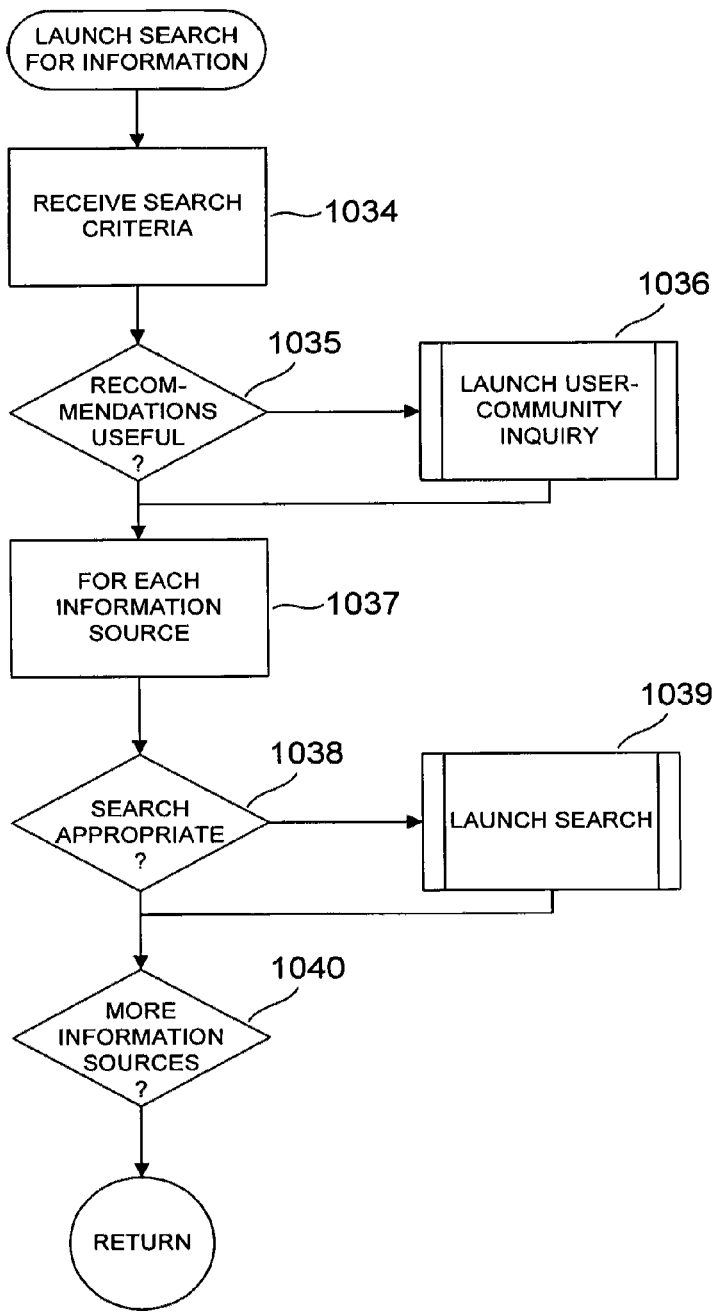

FIG. 10D provides a control-flow diagram for the information-searching routine called in step 1027 of FIG. 10C. In step 1034, the information-searching routine receives the search criteria for the search. The search criteria may be search criteria obtained from information parsed from the subject and message-body fields of a request message, or may be otherwise composed by the automated concierge system from information contained in messages and from other, subsequently obtained information. When the automated concierge system determines that relevant information may be provided by users of a user community, in step 1035, then the automated concierge system may launch a user-community inquiry via a routine call in step 1036. In the for-loop of steps 1037-1040, the automated concierge system considers each different possible information source and, when the information source is appropriate for the search, launches a search with respect to that information source via a routine call in step 1039.

Figure 10E:
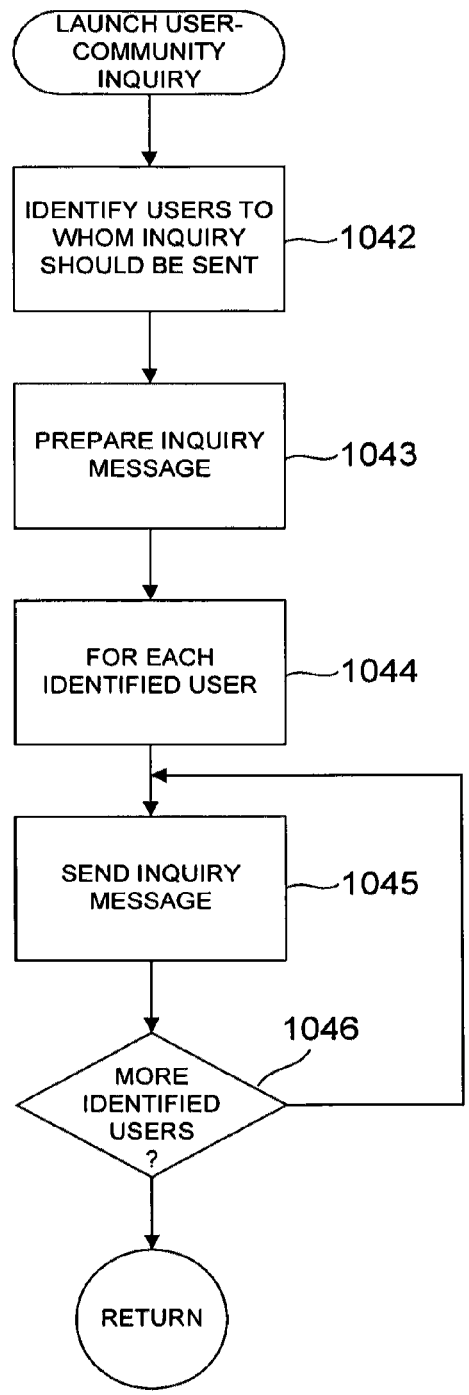

FIG. 10E provides a control-flow diagram for the routine, called in step 1036 of FIG. 10D, for launching a user-community inquiry. In step 1042, the automated concierge system identifies the users to whom the inquiry should be sent. Identification may involve accessing user databases and considering whether users have indicated availability and willingness to respond to such inquiries, considering whether the users have previously shown interest, through searching or other interactions with the concierge service, in the subject matter of the search, and considering other such information. Then, in step 1043, an inquiry message is prepared from the search criteria and other information contained in the initially received information request. Finally, in the for-loop of steps 1044-1046, the inquiry message is sent to each of the identified users.

Figure 10F:
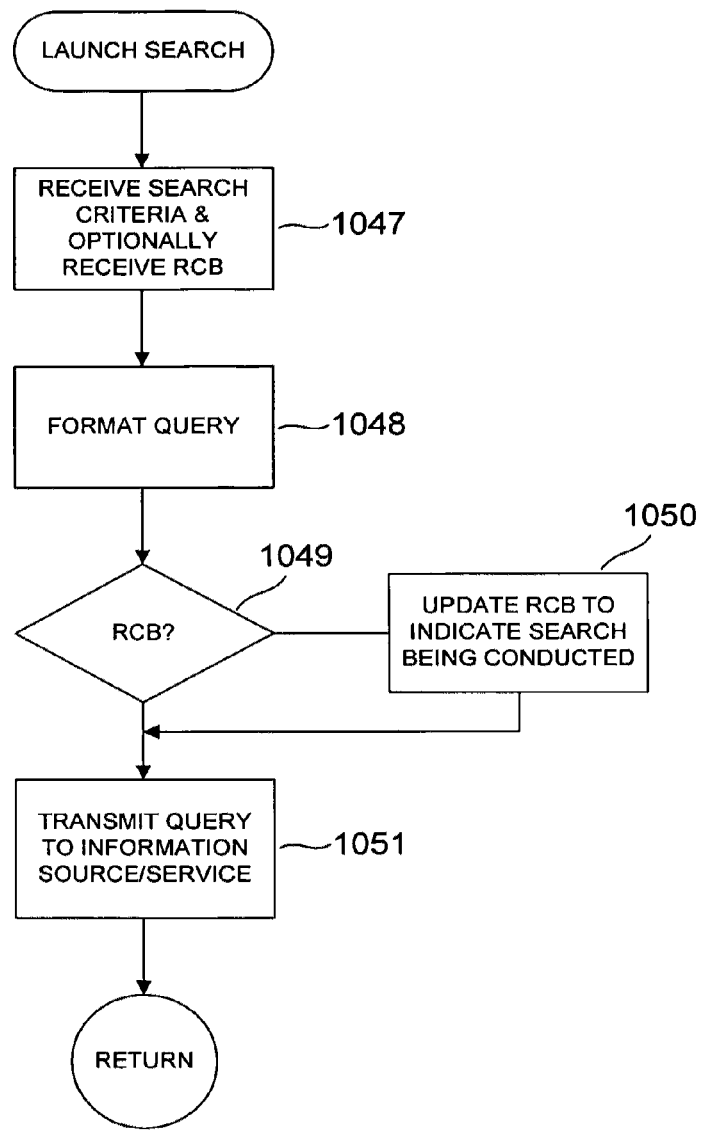

FIG. 10F illustrates the search-launching routine called in step 1039 of FIG. 10D. In step 1047, the search-launching routine receives the search criteria and may optionally receive a pointer to the rcb associated with the search. In step 1049, a query appropriate for the information source to which the search is directed is composed and formatted. If an rcb is supplied, as determined in step 1049, then the rcb is updated to indicate that an additional search is being conducted with regard to the overall search task represented by the rcb, in step 1050. In step 1051, the query, prepared in step 1048, is transmitted to the information source or service. Note that certain of the information sources may be electronic databases created and managed by the automated concierge system, in which case a process may be launched to directly access the database through a database-management-service interface. Other information sources include traditional search engines, particular web sites and web pages accessed through the Internet, other on-line sources of information, and may possibly include telephonic menu systems accessed through telephone dialogs, and even humans accessed by telephone, fax, or other communications means.

Figure 10G:
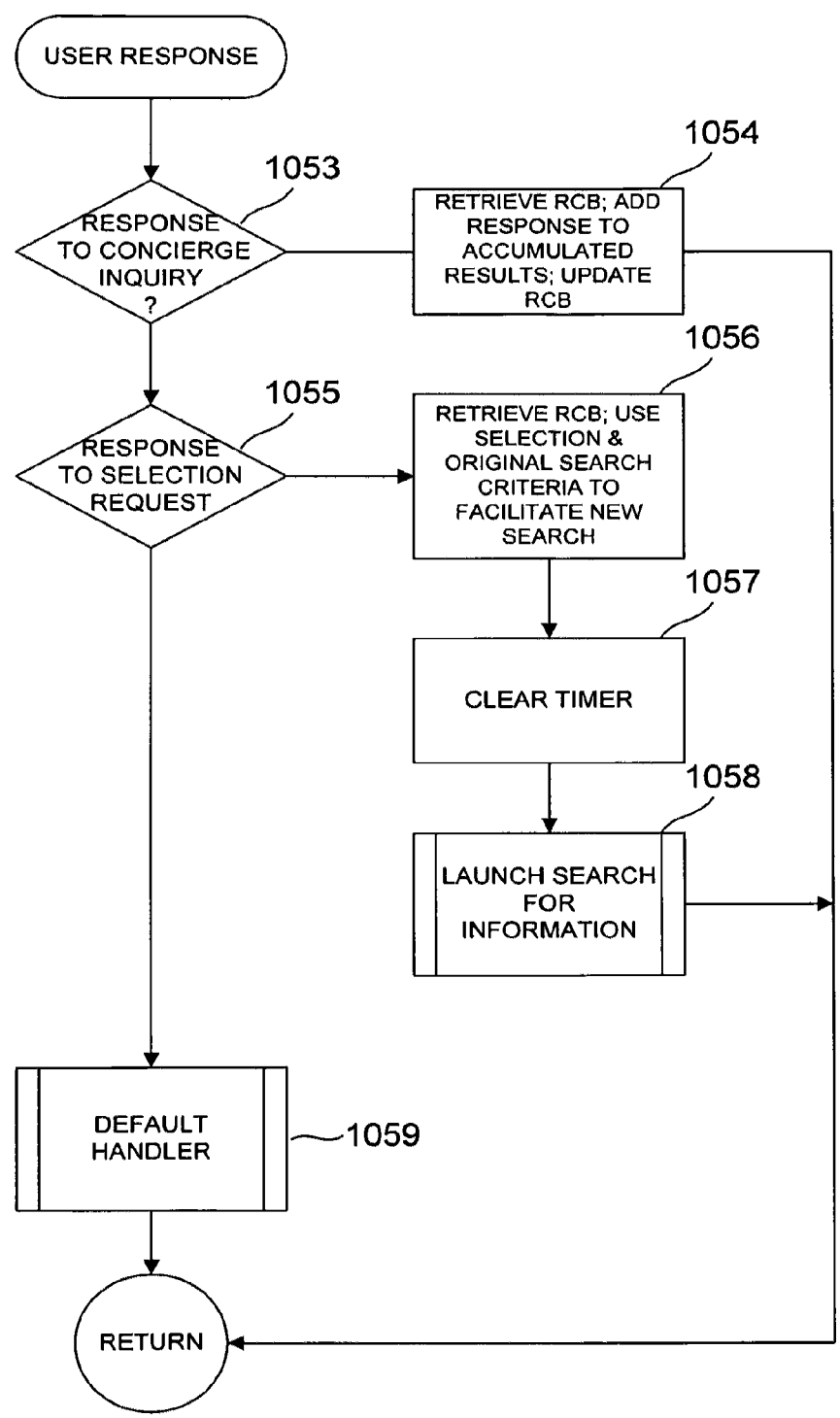

FIG. 10G provides a control-flow diagram for the routine "user response" called in step 1020 in FIG. 10B. If the received message is a response to a concierge inquiry, as determined in step 1053, then the automated concierge system retrieves the rcb related to a search task, adds the contents of the response message to accumulated results for the search represented by the rcb, and updates the rcb to indicate that the response was received, in step 1054. If the response is received from a previous narrowing criterion selection request message, as determined in step 1055, then, in step 1056, the automated concierge system retrieves the rcb for the search task, uses the original search criteria and the selected narrowing criteria to formulate a new search criteria, clears the timer originally associated with the search task, in step 1057, and launches a new search, in step 1058, to carry out the search task represented by the rcb. Other types of responses are handled by a default handler in step 1059.

Figure 10H:
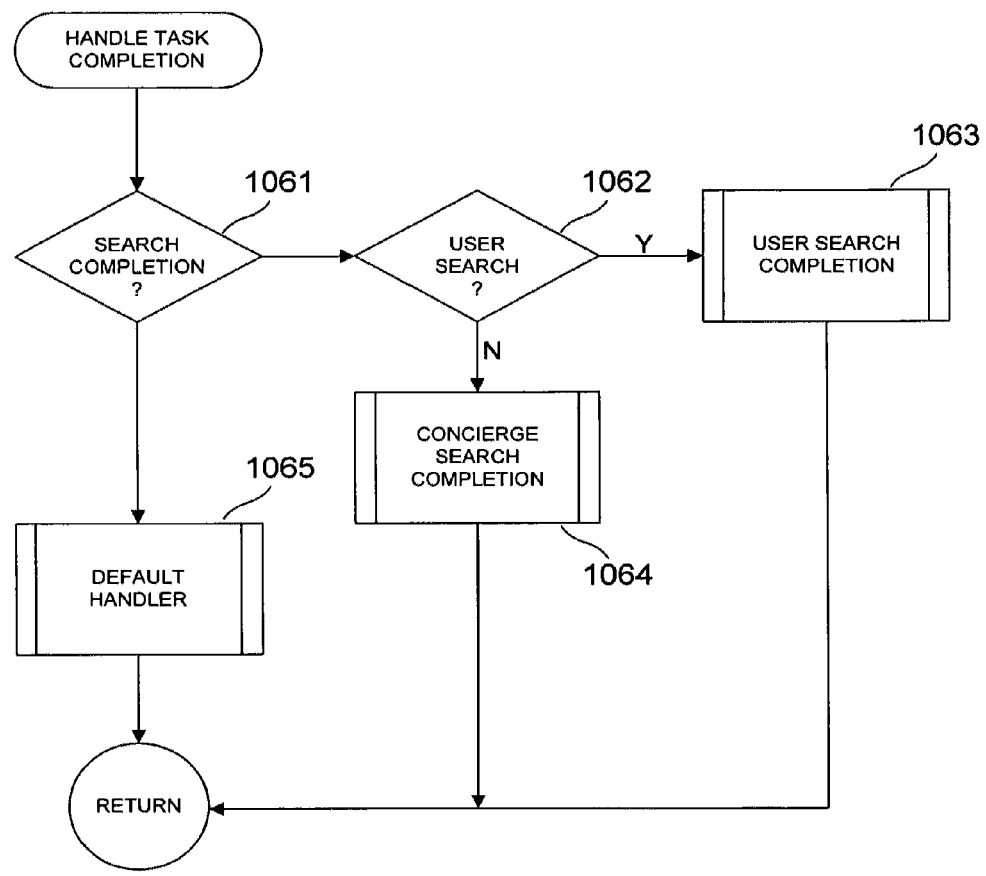

FIG. 10H provides a control-flow diagram for the task-completion handling routine called in step 1010 of FIG. 10A. If the task-completion event is the completion of a search task, as determined in 1061, then if the search for which the search completion event has occurred is a user search, as determined in step 1062, a user-search-completion routine is called in step 1063. Otherwise, a concierge-search-completion routine is called in step 1064. Other types of task completions are handled by a default handler in step 1065. Certain task-completion events occur when stored information sources respond with information, via various different information-source interfaces. In general, a process or thread is launched for each individual search, and that process or thread may raise a task-completion event when the search completes and information is returned to the automated concierge system.

Figure 10I:
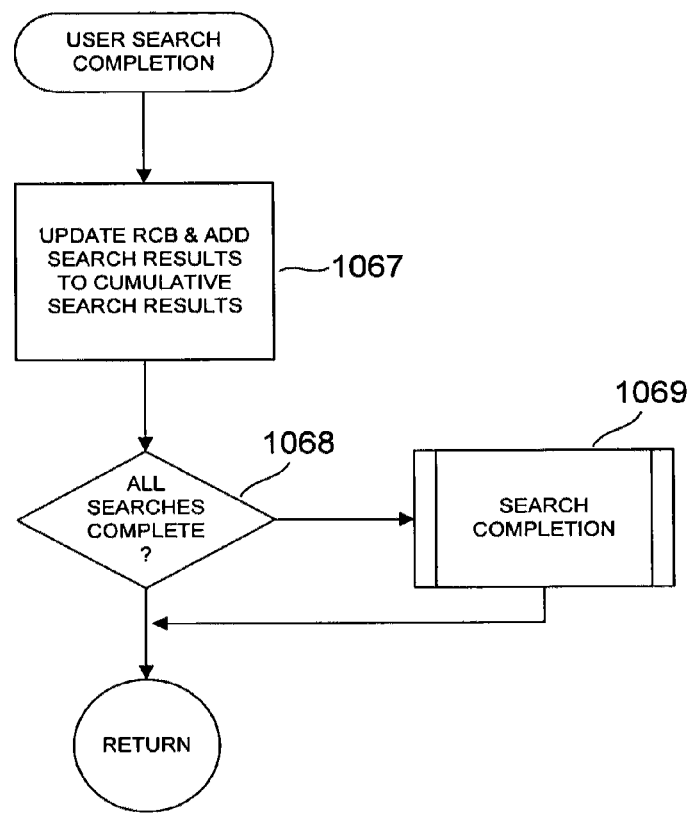

FIG. 10I provides a control-flow diagram for the user-search-completion routine called in step 1063 of FIG. 10H. In step 1067, the rcb associated with the search is updated and search results are added to the cumulative search results for the searching task. If all individual searches launched with respect to the overall search task have completed, as determined in step 1068, then a search-completion routine is called in step 1069.

Figure 10J:
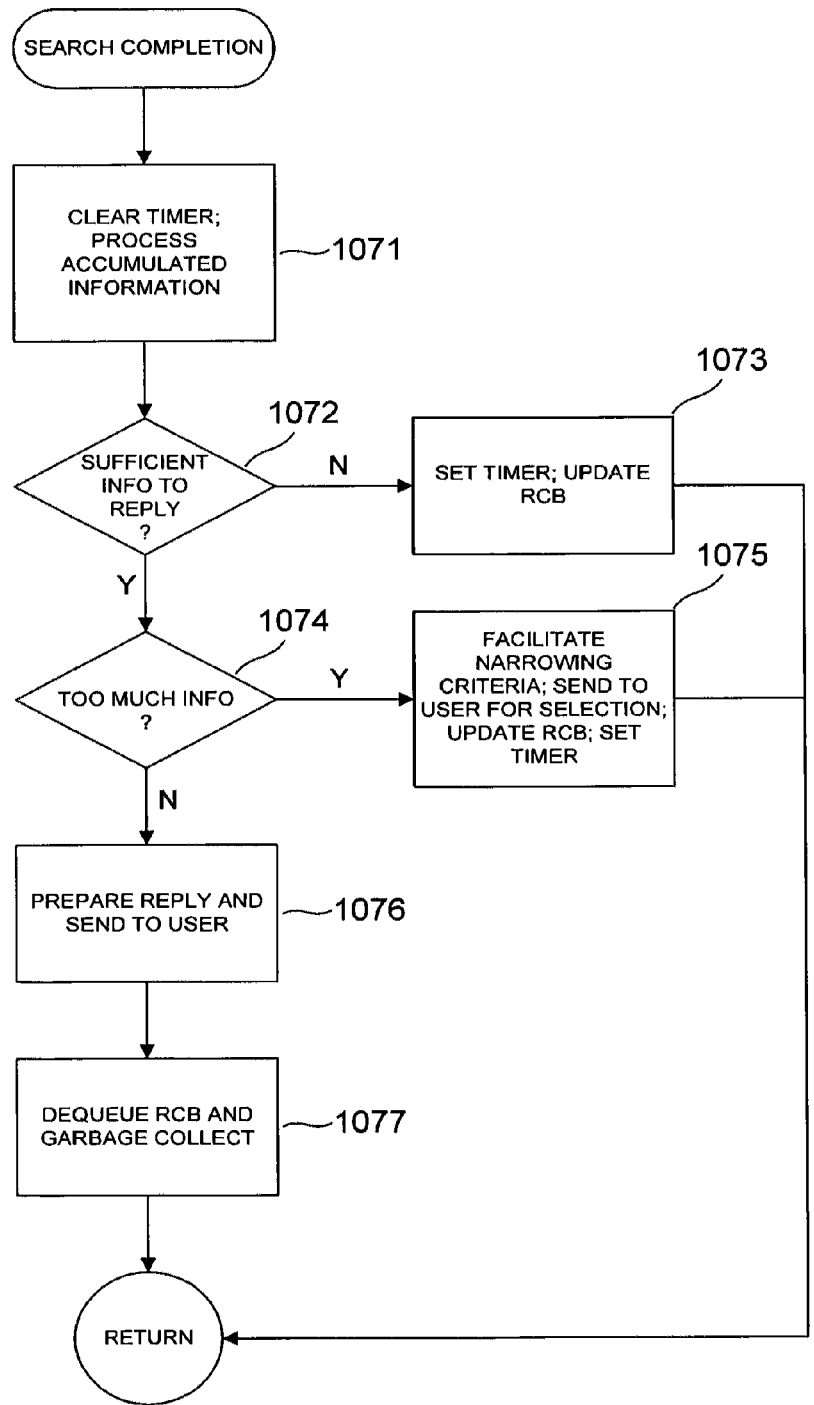

FIG. 10J provides a control-flow diagram for the routine "search completion" called in step 1069 of FIG. 10I. In step 1071, the timer associated with the search task is cleared and all of the cumulated search information for the search task is processed. Processing may involve extracting relevant and useful information, prioritizing the extracted information, formatting and altering the extracted information for conveyance to the user, and other such tasks. If an insufficient amount of information has been obtained by the various searches carried out on behalf of the overall search task, as determined in step 1072, then a timer is set and the rcb is updated to indicate that the search should be subsequently undertaken, again, at a future time in step 1073. The time interval between searches may be determined from stored user preferences, from stored configuration information, or may be, in addition, determined from the nature of the search and the automated concierge system's determination of an expectation time for the requested information to become available or accessible. When the timer subsequently expires, the search is undertaken again. If too much information has been obtained through the searches, as determined in step 1074, then the automated concierge system, in step 1075, formulates various alternative narrowing criteria and sends the various narrowing criteria to the user for selection in order to better focus the search, updating the rcb and setting a timer so that, should the user not respond, additional steps may be undertaken. Otherwise, in step 1076, a reply or response message is prepared by the automated concierge system to send to the user, including the information obtained on behalf of the user by the automated concierge system. Then, in step 1077, the rcb is de-queued and garbage collected, along with any ancillary resources, such as timers and additional data structures.

Figure 10K:
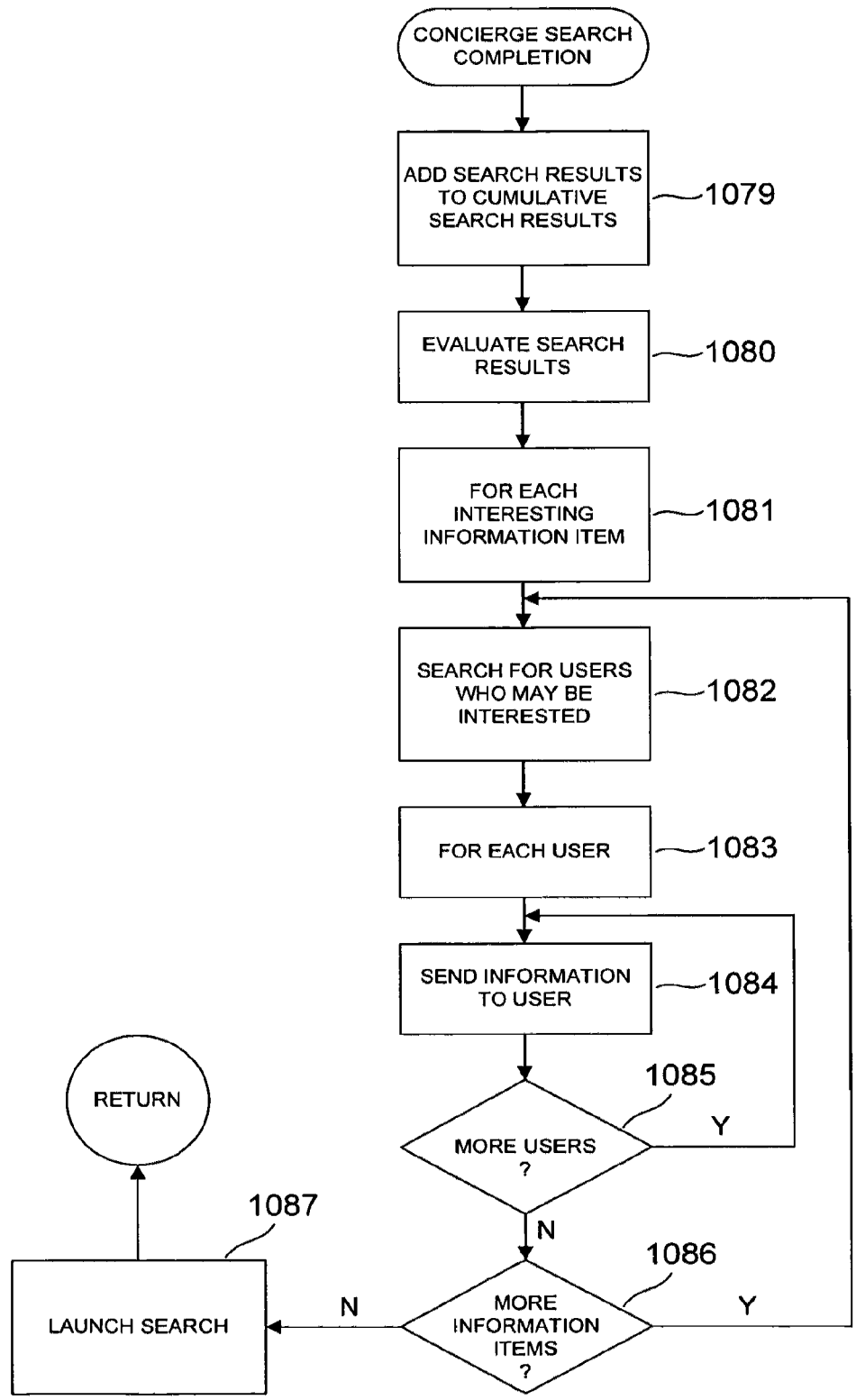

FIG. 10K provides a control-flow diagram for the concierge-search-completion routine called step 1064 of FIG. 10H. Concierge searches are the on-going, continuous searches undertaken by the automated concierge system in order to collect information that may be of use to users and provide unsolicited information messages to users. In step 1079, the search results obtained in the search just completed are added to cumulative search results. In step 1080, the cumulative search results are evaluated. In the for-loop of steps 1081-1086, for each interesting new piece of information gleaned from evaluating the cumulative search results, in step 1080, an unsolicited information message is sent to each user for whom the information may be of use or interest. Finally, in step 1087, a new search is launched to continue to accumulate interesting search results. The automated concierge system may be conducting many different parallel searches on a continuous basis.

Figure 10L:
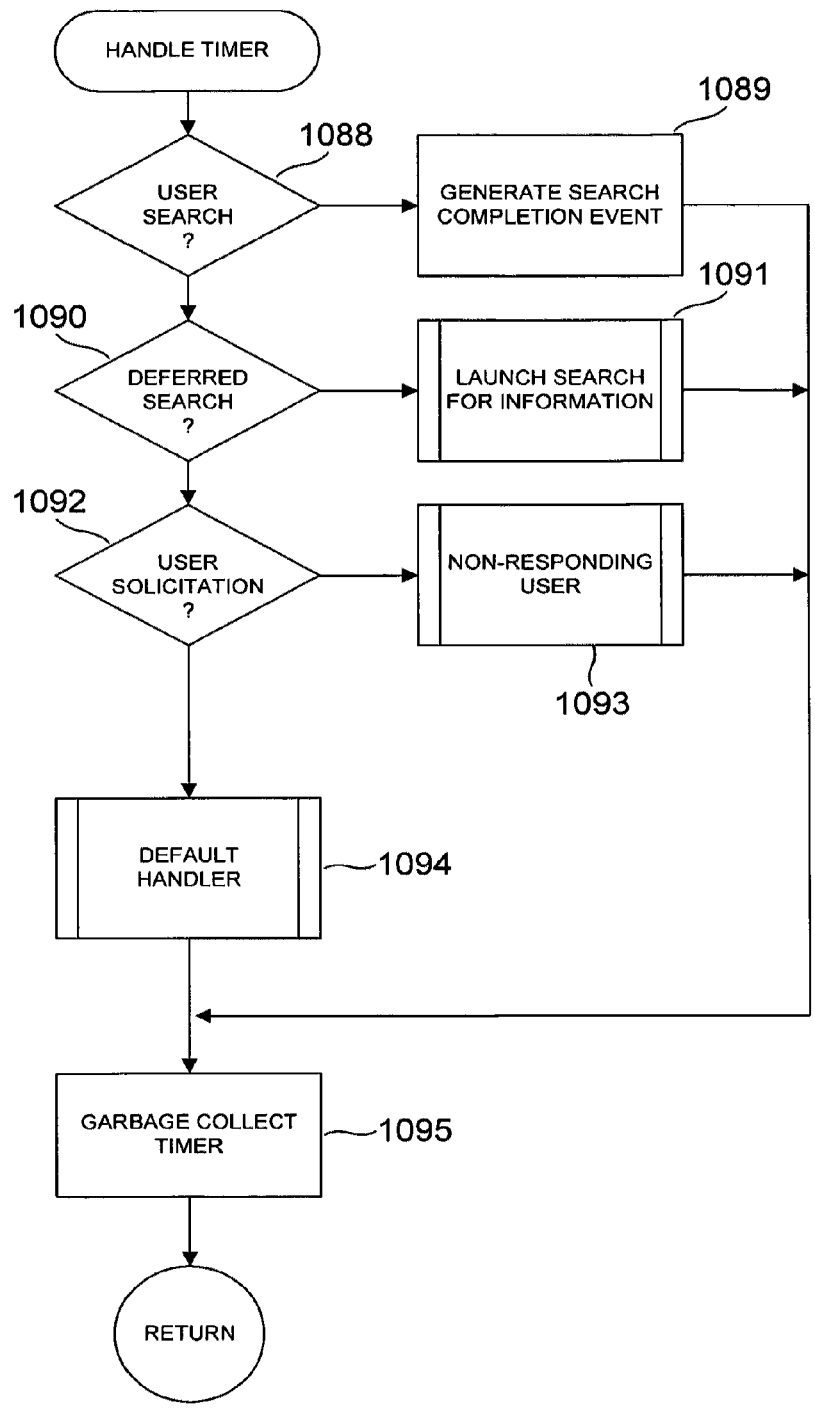

FIG. 10L provides a control-flow diagram for the timer-handling routine called in step 1008 of FIG. 10A. If the expired timer is a user-search-associated timer, as determined in step 1088, the automated concierge system generates a search-completion event, in step 1089, so that whatever intermediate search results have been obtained for a search task are processed and handled on behalf of the user. If the expired timer is associated with a deferred search, as determined in step 1090, then the automated concierge system launches a new search on behalf of the user in step 1091. If the timer is associated with a solicitation message sent to a user, such as a request for the user to select narrowing search criteria, as determined in step 1092, then a non-responding user routine is called, in step 1093, to handle the situation. In certain cases, the search may be delayed or deferred, while, in other cases, the solicitation message may be re-sent to the user. If more than a threshold number of messages have previously been sent, the search may be abandoned and the user informed by a search-termination message. Other types of timer expirations are handled by a default handler, in step 1094. Finally, in step 1095, the timer is garbage collected.

Again, to summarize, the automated concierge system that represents an embodiment of the present invention is a general information-search-and-retrieval system that is implemented in software and hardware and that executes on one or more server computer systems that may be interconnected with disk arrays, additional search-related computer systems, and other resources through various types of communications media. The automated concierge system is designed to communicate with users through messaging services, such as email, SMS text messages, IM messaging, and other such message-based media and protocols. In addition, the automated concierge system may directly communicate through telephone communications, fax communications, and other such communications media with service-provider menu systems and even humans. The automated concierge system relaxes many of the limitations and constraints of traditional search-engine and query-processing-system information services. Responses to information requests may be delivered immediately, or may follow the request by arbitrary periods of time, depending on user preferences, information availability, and other factors. The automated concierge system uses many different types of information about users, user preferences and previous information requests, the user's location, the current date and time, the devices and communications media through which the users access the automated concierge system and through which the user expects responses to be returned, and much additional stored information about various information sources and pre-processed and pre-indexed information retrieved in previous searching activities. The automated concierge system can access many different types of information sources, from web-based information to human users in a user community and much additional stored and indexed information previously obtained by the automated concierge system. Furthermore, the automated concierge system may undertake dialogs with users in order to appropriately focus searches, provide services, and carry out other tasks on behalf of users.

Although the present invention has been described in terms of particular embodiments, it is not intended that the invention be limited to these embodiments. Modifications within the spirit of the invention will be apparent to those skilled in the art. For example, automated concierge systems may be implemented in many different ways, by changing various programming and hardware-implementation parameters, including selecting any of various operating systems, programming languages, modular organizations, data structures, control structures, hardware platforms, communications media, processing and other components, etc. Automated concierge systems may be designed to communicate with users by any of many different messaging systems and interfaces, as well as by traditional communications media, such as telephone, and by more traditional request/response protocols via computer networking and familiar networking protocols, such as TCP/IP. Alternative embodiments of the automated concierge system may access any of a wide variety of different information sources, from electronic databases, web pages, on-line information services, human users within a user community, service-provider interfaces, and many types of electronic database-management systems. Automated concierge systems may be designed to process natural language, to employ template-based or form-based search queries, perform automated, pre-defined searches, and perform various service-provision-related tasks.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An automated information-search and information-retrieval system comprising:
   a computer system associated with database systems and interconnected to information sources through one or more communications media;
   a message-receiving component that runs on the computer system and that receives information-request, service-request, and response messages from users through one or more message services, including an email service and an SMS text-message service;
   a message-processing component that runs on the computer system and that processes received information-request and service-request messages to generate state-associated search tasks and state-associated service-provision tasks, and that processes received response messages to facilitate already-generated search tasks;
   a searching component that queries information sources, including databases, search engines, and websites to carry out search tasks;
   a service-provision component that identifies service providers and carries out service-provision transactions with identified service providers on behalf of users; and
   a reply component that transmits replies to information-request and service-request messages received from users containing results obtained by the searching component and service-provision component.

2. The automated information-search and information-retrieval system of claim 1 wherein information-request and service-request messages are submitted as natural-language queries.

3. The automated information-search and information-retrieval system of claim 1 wherein the messages services include, in addition to email and SMS text messages, additional asynchronous messaging services, including an IM message service, a voice-mail service, a fax service, and multimedia messages.

4. The automated information-search and information-retrieval system of claim 1 wherein information-request and service-request messages are submitted according to template messages or forms.

5. The automated information-search and information-retrieval system of claim 1 wherein information sources accessed by the automated information-search and information-retrieval system include:
   search engines accessed via the Internet;
   local electronic database-management systems;
   remote database-management systems;
   human users;
   web sites;
   on-line information-provision systems; and
   service-provider interfaces, including telephonic menu interfaces, web sites, human representatives, and fax interfaces.

6. The automated information-search and information-retrieval system of claim 1 wherein the message-processing component creates a request control block to represent each received information-request and service-request message.

7. The automated information-search and information-retrieval system of claim 1 wherein the message-processing component launches a number of searches, each search directed to one or more information sources, in order to prepare to respond to a received information-request message.

8. The automated information-search and information-retrieval system of claim 7 wherein the message-processing component employs one or more different types of information to launch a search of an information source including:
- a user's message-service address;
- a user's geographical location;
- the date and time of a request;
- a history of a user's information-search and service-provision requests;
- stored user preferences;
- stored configuration parameters;
- information extracted from subject and massage-body fields of a user's information-search or service-provision request message;
- results of natural-language processing of a user's information-search or service-provision request message;
- stored information accessed using information supplied by a user in an information-search or service-provision request message;
- a user's community interests; and
- information relayed by user's contacts.

9. The automated information-search and information-retrieval system of claim 1 where the message-processing component carries out single or recurring search tasks and forwards search results to the reply component
- immediately;
- at regular intervals;
- at irregular intervals;
- at a time at which a successful search is expected to be able to be carried out; or
- at a time specified by the requesting user.

10. The automated information-search and information-retrieval system of claim 1 wherein the automated information-search and information-retrieval system continuously searches for new information and forwards information to users that the automated information-search and information-retrieval system determines to have use or interest for the new information.

11. The automated information-search and information-retrieval system of claim 1 wherein the automated information-search and information-retrieval system may carry out a message-based dialogue with a user to modify a search request to enable the automated information-search and information-retrieval system to effectively carry out a search on behalf of the user, including:
- refining the request to increase relevance;
- renewing single or recurring requests; and
- unsubscribing recurring requests.

12. The automated information-search and information-retrieval system of claim 1 wherein the automated information-search and information-retrieval system may carry out a message-based dialogue with a user to, in turn, conduct a service-provision transaction, including connection transactions, bandwidth throttling, and single or recurring actions, including payment transactions, with a service provider, including internal domain-specific data centers and a public API-based data center.

13. The automated information-search and information-retrieval system of claim 1 where the message-processing component identifies the specific results relevant to the user request without the user needing to further browse for information, providing one or more of:
- content from a single source;
- aggregated result from multiple sources;
- an optional URL that points to other data sources to augment the results.

* * * * *